(12) United States Patent
Moriwaki

(10) Patent No.: US 11,761,768 B2
(45) Date of Patent: Sep. 19, 2023

(54) ROUTE NAVIGATION SYSTEM FOR SHIPS, AND A PROGRAM THEREOF

(71) Applicant: Earth Weather, Inc., Yokohama (JP)

(72) Inventor: Makoto Moriwaki, Yokohama (JP)

(73) Assignee: Earth Weather, Inc., Yokohama (JP)

( * ) Notice: Subject to any disclaimer, the term of this patent is extended or adjusted under 35 U.S.C. 154(b) by 498 days.

(21) Appl. No.: 17/053,855

(22) PCT Filed: Nov. 27, 2019

(86) PCT No.: PCT/JP2019/046291
§ 371 (c)(1),
(2) Date: Nov. 9, 2020

(87) PCT Pub. No.: WO2021/106096
PCT Pub. Date: Jun. 3, 2021

(65) Prior Publication Data
US 2021/0156692 A1    May 27, 2021

(51) Int. Cl.
*B63B 79/40* (2020.01)
*G01C 21/20* (2006.01)
(Continued)

(52) U.S. Cl.
CPC .............. *G01C 21/20* (2013.01); *B63B 79/15* (2020.01); *B63B 79/40* (2020.01); *G01C 21/005* (2013.01);
(Continued)

(58) Field of Classification Search
CPC ..... B63B 79/15; B63B 79/40; B63B 2213/02; G01C 21/005; G01C 21/165; G01C 21/20; G01C 21/203; Y02T 70/00
See application file for complete search history.

(56) References Cited

U.S. PATENT DOCUMENTS

| 7,860,646 B2 | 12/2010 | Bruce et al. |
| 9,132,773 B2 * | 9/2015 | Washlow ............... G01S 7/003 |

(Continued)

FOREIGN PATENT DOCUMENTS

| JP | 1993233999 A | 9/1993 |
| JP | 2009286230 A | 12/2009 |

(Continued)

OTHER PUBLICATIONS

Tycholiz et al., Mesh-based internet on the Baltic sea for improving e-navigation services. A case study, 2017, IEEE, p. 1-6 (Year: 2017).*

(Continued)

*Primary Examiner* — McDieunel Marc
(74) *Attorney, Agent, or Firm* — Rahman LLC

(57) ABSTRACT

The route navigation system includes a weather information distributing server which distributes weather data obtained from a weather sensor, a marine information distributing server which distributes marine data obtained from a marine sensor, a satellite information distributing server which distributes satellite data obtained from an artificial satellite, a route navigation server which performs route navigation for ships when requested and a terminal device that processes a certain application, and that obtains a result of the route navigation from the route navigation server and displays the result in a state where a user requests the route navigation via the application. With this configuration, the route navigation system provides ships with more accurate, safer, and more economical route navigation by utilizing cloud computation via the Internet.

14 Claims, 30 Drawing Sheets

(51) Int. Cl.
*G01C 21/00* (2006.01)
*G01C 21/16* (2006.01)
*B63B 79/15* (2020.01)

(52) U.S. Cl.
CPC ........ *G01C 21/165* (2013.01); *B63B 2213/02* (2013.01)

(56) References Cited

U.S. PATENT DOCUMENTS

| | | | |
|---|---|---|---|
| 10,226,982 B2 * | 3/2019 | Alger | G06V 20/56 |
| 10,895,802 B1 * | 1/2021 | Suresh | G01S 7/003 |
| 11,436,930 B2 * | 9/2022 | Ali | G08G 5/0069 |
| 2012/0259489 A1 | 10/2012 | Hamamatsu et al. | |
| 2016/0195399 A1 | 7/2016 | Nanri et al. | |
| 2021/0089055 A1 * | 3/2021 | Tran | B64C 27/20 |
| 2022/0155407 A1 * | 5/2022 | Ross | G05D 1/0221 |

FOREIGN PATENT DOCUMENTS

| | | | |
|---|---|---|---|
| JP | 2010197311 A | 9/2010 | |
| JP | 201912029 A | 1/2019 | |
| WO | 2014115352 A1 | 7/2014 | |
| WO | 2014128915 A1 | 8/2014 | |
| WO | 2014192531 A1 | 12/2014 | |
| WO | 2019004416 A1 | 1/2019 | |

OTHER PUBLICATIONS

Gourgoulis et al., An Intelligent Maritime Workplace using IT technologies, 2008, IEEE, p. 283-389 (Year: 2008).*

Kwon et al., Implementation of Marine Weather Information Service System Based on Location of User, 2014, IEEE, p. 1-4 (Year: 2014).*

Sorribas et al., Real-Time Fleet Ship Monitoring System Using Satellite Broadband Communications and Google Earth, 2009, IEEE, p. 146-155 (Year: 2009).*

Moriwaki, M., Supplementary European Search Report, EP Application No. 19954699, dated Mar. 17, 2022, 5 pages.

International Search Report, PCT/JP2019/046291, dated Nov. 27, 2019, 10 pages with English translation of Written Opinion (2 pages).

* cited by examiner

FIG. 8

(Example)

801

| Ship Name | XXX Ship | Remarks |
|---|---|---|
| FULL LOAD speed (kt) | 15 | No Sea-margin |
| FULL LOAD displacement (t) | 300000 | |
| FULL LOAD Speed (kt) | 16 | No Sea-margin |
| HEAVY BALLAST displacement (t) | 150000 | |
| Horsepower (hp) | 18000 | |
| Fuel Consumption (ton/day) | 75 | |
| Engine Speed (rpm) | 80 | |
| Cargo Type | Coal | • Select the type of cargo from the list below<br>1: No Cargo<br>2: Coal<br>3: ORE<br>4: Steel Coil<br>5: Grain<br>6: Cement<br>• Please select "storage factor" if you can't select from 1-6. |
| storage factor ("ft³/t") | 30 | Not required to input if cargo type is filled. |
| Date of Manufacture | 2015/7/3 | |
| IMO No. | IMO0000000 | |

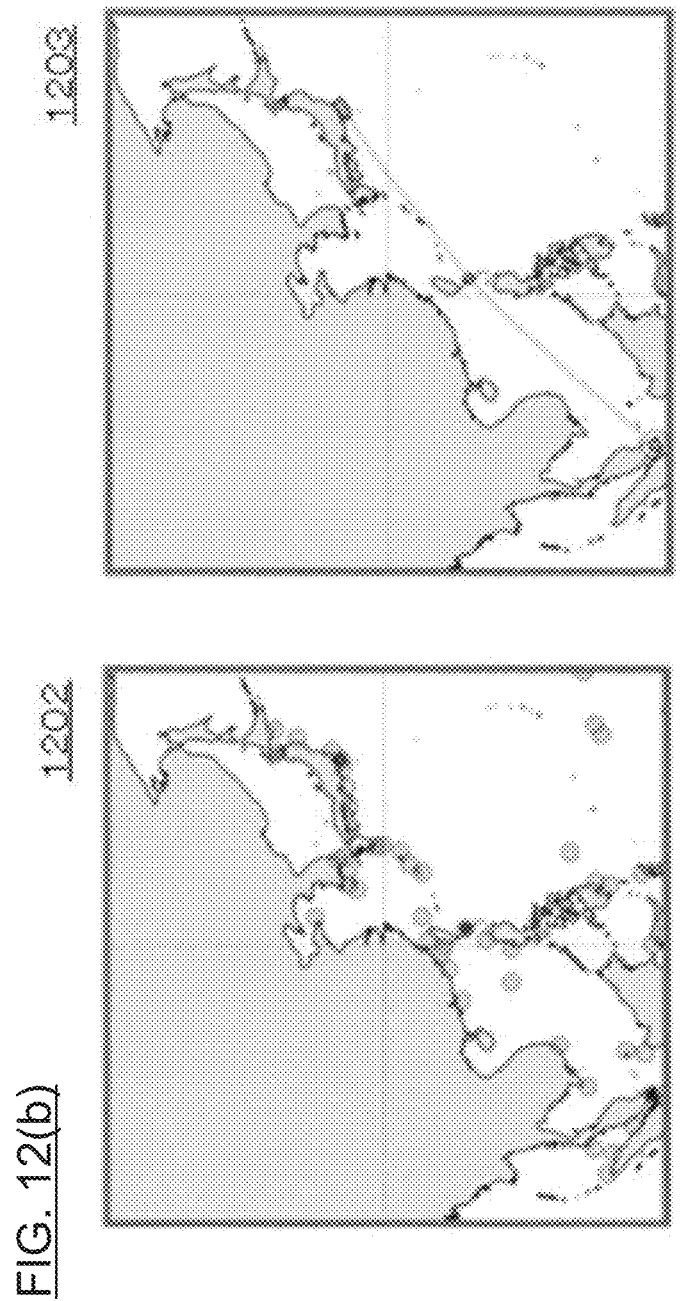

| Point No. | Point Number |
| Lat. | Latitude of the ship |
| Lon | Longitude of the ship |
| Course(Deg.) | Course (Degree) |
| Speed(kt) | Estimated speed (knot) when sailing |
| Day | Day based on the voyage period |
| Dist.(mile) | Distance (mile) |
| Fuel(ton) | Fuel Consumption (ton) |
| RPM | Engine Speed (rpm) |
| PITCH(Deg.) | Pitch (Degree) |
| ROLL(Deg.) | Roll (Degree) |
| V Acceleration | Vertical Acceleration |
| H Acceleration | Horizontal Acceleration |
| Sea Margin | Sea Margin |
| Wave·Wind.kt | Influences on ship speed by wave · wind (kt) |
| Current(kt) | Influences on ship by ocean current (kt) |
| Wave Hight(m) | Average Wave Height (m) |
| Period(s) | Period |
| Direction(Deg.) | Direction of wave, wind from the ship side (Degree) |

| Ship's Name | GOLDEN RAY |
|---|---|
| Full Load Speed (kt) | 18 |
| Full Load Displacement (t) | 42428 |
| Heavy Ballast Speed (kt) | - |
| Heavy Ballast Displacement (t) | - |
| Fuel Consumption (ton/day) | 50 |
| M/E Rotation (rpm) | 77.2 |
| Built Year | 12/15/2017 |
| IMO No. | 9775816 |

FIG. 23

| PTUDTC | PTRUTC | Speed kn | Time hr | Distance m | Position |
|---|---|---|---|---|---|
| 2018/12/29 3:00 | 2019/1/11 16:59 | 15.33 | 542 | 8310.66 | 1001.41 |
| 2018/12/29 3:00 | 2019/1/11 16:59 | 14.38 | 542 | 7794.86 | 892.1 |
| | | 0.95 | 0 | 515.8 | 109.31 |

2301

ROUTE NAVIGATION SYSTEM FOR SHIPS, AND A PROGRAM THEREOF

CROSS-REFERENCE TO RELATED APPLICATIONS

This application is a 371 national stage application of PCT/JP2019/046291 filed on Nov. 27, 2019, the complete disclosure of which, in its entirety, is herein incorporated by reference.

BACKGROUND OF THE INVENTION

1. Field of the Invention

This invention relates to a route navigation system for ships which conduct ocean voyage.

2. Description of the Related Art

In terms of ocean voyage, it is preferable to select the safest and most economical route after taking weather/marine meteorology such as winds, waves, ocean currents into consideration. Conventionally, major weather companies (such as Weather News Co., Ltd. In Japan, Applied Weather Technology Co., Ltd. in America) have been providing weather routing service related to ocean voyage.

One of the basic methods for weather routing is (1) obtaining conditions of a ship (ship name, major items, departure port/arrival port, schedules, cargo type and so on), (2) obtaining weather/marine information, (3) route simulation, (4) providing an optimum sailing route to a ship. Then, if a ship needs any services while sailing, the ship provide information including location to the weather routing company and receive instructions from the company. After arrival, they are required to report the sailing route and any other information to the routing company.

By the way, an optimum route calculation system is disclosed (refer to Patent Reference 1). This optimum route calculation system has an isochronous curve method adopting as an optimization method for finding the optimum route, and that has a means for designating a required passing point that can arbitrarily specify a required passing point WP, a means for changing isochro n e that changes the search length, search interval and search range used in the isochronous curve method depending on the distance between the required passing points. Furthermore, a data processing device, which is operable to estimating time or fuel consumption amount required for sailing ship, is also disclosed (refer to Patent Reference 2).

Patent Reference 1: Japanese Laid-Open Patent Application No. 2013-104690 Publication
Patent Reference 2: Japanese Laid-Open Patent No. 6281022 Publication

BRIEF SUMMARY OF THE INVENTION

However, currently, despite the routing services have been provided for more than 50 years by those companies, their world shares reach less than 10% (about 100,000 ships in 2016 in the world), which is very small.

The first problem thereof, is that a conventional weather routing selects an optimum route based on data relating to only wave height. However, there are many weather/marine factors, which can affect a voyage, such as winds, waves, ocean currents and so on. Therefore, the navigating accuracy is still low when it depends on merely wave height.

The second problem thereof, is that route decision still depends on human judgment (such as by a captain, a certified weather forecaster of a routing company, a person in charge). In other words, routing advises are decided based on past statistics, instincts and experiences by a person in charge, and so on. Said human advices, which highly depend on human experiences and instincts, are not so accurate in many cases.

The third problem thereof, is that a conventional route navigation, which is shown in reference 1, uses mainly an isochrone method and estimates only the shortest period route. Herein, as shown in FIG. 28, the isochrone method is a method for seeking the longest branch (route) at the same time period. Firstly, this method creates a curved line, which connects a plurality of points, wherein it takes a certain period of time to reach to the next point, from a departing point. In this method, a plurality of points, which can be reached from a representative point on a curved line at a certain time, can be calculated using the method that creates a curved line as a result, which consists of a plurality of points, wherein each point is the farthest from the departing point. By repeating these calculations, this method can decide the shortest period route to a destination.

With this isochrone method, in a state where a recommended route faces rough weather, a person in charge will consult with the routing company and it is so common to receive advice of taking a detour to a lower wave height direction. For example, the current route navigation system just takes a detour to avoid rough weather, if the ship is heading to the point having more than 4 or 5 m wave height. However, this method ends up increasing fuel consumption rapidly. In other words, the conventional isochrone method could just avoid heading to rough weather region, and that does not take the real influences of the ship by weather/marine meteorology into the route. Consequently, an optimum route navigating, which think highly of safety/economical efficiency, has not been achieved yet.

The fourth problem thereof is that a routing calculation, such as shown in reference 2, does not take any cargo's information into the routing calculation. There are various types of ships, which is ranging from large-sized cargo ships to small ships. Each ship is affected a lot by weather/marine meteorology according to the type of the ship. However, a conventional routing calculation, such as shown in reference 2, cannot provide optimum routing information based on the conditions of each ship.

The fifth problem thereof, is that there are no route navigation services, which can provide excellent usability to users. Speaking of a global environmental problem, massive reductions of $CO_2$ and SOx, which are in proportion with fuel consumption, must be an urgent issue. Shipping businesses in the world are asked to do immediate action to prevent this type of problem. I.M.O. (International Maritime Organization), which belongs to the United Nations, has already decided a global regulation of fuel reduction by 20% on January 2020 and 40% by 2030, compared to 2008. Small ships with more than 3,000 tons are included in this regulation. Since the number of these ships is more than 120,000 and have various types, appropriate advice for each ship cannot be achieved by human power from certified weather forecasters, captains and so on.

The present invention has been made in view of the above-mentioned problems, and has an objective to provide a route navigation system, which has higher estimation accuracy, safer and more economical while making use of cloud computation via the Internet.

DISCLOSURE OF INVENTION

In order to solve the abovementioned issues, the present invention is a route navigation system for ships to provide a navigation route, the route navigation system comprising: a weather information distributing server which distributes weather data obtained from a weather sensor; a marine information distributing server which distributes marine data obtained from a marine sensor; a satellite information distributing server which distributes satellite data obtained from an artificial satellite; a route navigation server which performs route navigation for ships by obtaining data from the weather information distributing server, the marine information distributing server, and the satellite information distributing server when requested; and a terminal device that processes a certain application, and that obtains a result of the route navigation from the route navigation server and displays the result in a state where a user requests the route navigation via the application, wherein the weather information distributing server, the marine information distributing server, the satellite information distributing server, the route navigation server and the terminal device are connected to one another via the Internet.

In this route navigation system, preferably, wherein the route navigation system further comprising: a weather•marine information obtaining unit that obtains weather information from the weather information distributing server and marine information from the marine information distributing server; a satellite information obtaining unit that obtains satellite information from the satellite information distributing server; a weather•marine information memory unit that memorizes weather•marine information obtained by the weather•marine information obtaining unit and analyzed weather•marine information; a satellite information memory unit that memorizes satellite information obtained by the satellite information obtaining unit and analyzed satellite information; a user information memory unit that memorizes information relating to a user of the terminal device; a route estimation unit that performs a route navigation using the weather•marine information and the satellite information in a state where a user requests the route navigation; a user judgment unit that judges a user of the terminal device; and a transmit-receive unit that transmits and receives data among the weather information distributing server, the satellite information distributing server, the marine information distributing server and the terminal device.

In this route navigation system, preferably, wherein the route estimation unit comprising:

an oceanic current analysis unit that analyzes ocean current direction and current speed based on satellite information obtained by the satellite information obtaining unit and observation information of weather•marine information obtained by the weather•marine information obtaining unit; a long term weather•marine conditions analysis unit that generates future weather•marine scenarios based on satellite information obtained by the satellite information obtaining unit, various weather•marine observation data obtained by the weather•marine information obtaining unit, data memorized in the weather•marine information memory unit, and data memorized in the satellite information memory unit; a ship resistance force calculation unit that performs analysis, which is integrated with seaworthiness theory, wave resistance increase and vessel rolling control based on a result from the oceanic current analysis unit and the long term weather•marine conditions analysis unit, and that calculates a resistance force of a vessel by wave•wind•swell•ocean current; and an optimum navigation route analysis unit that utilizes analysis result by the oceanic current analysis unit, the long term weather•marine conditions analysis unit and the ship resisting force calculation unit, and that carries out optimum route navigation using Dynamic Program Dijkstra's Algorithm.

In this route navigation system, preferably, wherein the route estimation unit is operable to calculate at least one of the position of the ship (Longitude, Latitude), the ship course (Course (Deg.), estimated speed during a voyage (Speed (kt)), days calculated based on hours (Day), voyage distance (Dist. (mile)), fuel consumption (Fuel (ton)), engine speed (RPM), Pitch degree (Pitch (Deg.)), Rolling degree (Roll (Deg.)), Vertical Acceleration (V Acceleration), Horizontal Acceleration (H Acceleration), Sea margin (Sea Margin), Wave•Wind influence on the speed of the ship (Wave•Wind (kt)), Current influences on the speed of the ship (Current(kt)), Wave height (Wave Height (m)), Wave period (Period (s)), and Wind direction from the ship (Direction (deg.)), according to each point number (Point No.) on a map.

In this route navigation system, preferably, wherein the ship resistance force calculation unit is operable to estimate decreasing speed value, which is influencing forces by wind and waves (Wave/Wind(kt) against the ship, based on wave height (wave heights(m)), wave periods (periods) and wave•wind direction from the ship (Direction(Deg)) analyzed by the ocean current analysis unit and the long term weather•marine conditions analysis unit, and to calculate fuel consumption (Fuel consumption(ton/day)) based on the decreasing speed value at each mesh point on the map.

In this route navigation system, preferably, wherein the ship resistance force calculation unit is operable to calculate vertical acceleration (V Acceleration) and horizontal acceleration (H Acceleration) of the ship based on wave heights (m) and wave direction (Deg) at each mesh point obtained from the ocean current analysis unit and the long term weather•marine conditions analysis unit.

In this route navigation system, preferably, wherein the optimum navigation route analysis unit does not include a point in the navigation route in a state where said calculated vertical acceleration (V Acceleration) and horizontal acceleration (H Acceleration) at the point are more than a certain threshold.

In this route navigation system, preferably, wherein the certain threshold is in a range between 0.5~0.8 G according to a type of the ship.

In this route navigation system, preferably, wherein the terminal device comprising; an input unit that accepts input information from the user; an application processing unit that performs a specialized application in the form of a Web browser to perform route navigation; a request generation unit that generates a route navigation request to the route navigation server when a route navigation request is required from the user via the input unit; a transmit and receive unit that transmits the route navigation request to the route navigation server; a processing unit that performs GUI display based on the navigation result when the navigation result is received from the route navigation server; a memory unit; and a display unit that displays GUI.

In this route navigation system, preferably, wherein the specialized application requires the user to set a ship specification information as an initial registration via the input unit, and wherein the ship specification includes at least one of the ship name, FULL LOAD speed (kt), FULL LOAD displacement weight(t), HEAVY BALLAST speed(kt), HEAVY BALLAST displacement weight(t), horsepower (kw), fuel consumption (ton/day), engine roll per minutes (rpm), cargo type, storage factor, the date of the production, and IMO number.

In this route navigation system, preferably, wherein the terminal device requires the user to input a departure port, an arrival port, basic information (engine speed, fuel consumption, and cargo type) via the input unit after a log-in of the specialized application.

In this route navigation system, preferably, wherein the display unit displays at least one of Minimum fuel route, Minimum Time route and Minimum Distance route on the map in a state where the terminal device performs a simulation.

In this route navigation system, preferably, wherein dangerous points can be colored in a different coloration in a state where the terminal device performs a simulation.

In order to solve the abovementioned issues, the present invention is a program for a route navigation system for ships, the route navigation system comprising: a weather information distributing server which distributes weather data obtained from a weather sensor; a marine information distributing server which distributes marine data obtained from a marine sensor; a satellite information distributing server which distributes satellite data obtained from an artificial satellite; a route navigation server which performs route navigation for ships by obtaining data from the weather information distributing server, the marine information distributing server, and the satellite information distributing server when requested; and a terminal device that processes a certain application, and that obtains a result of the route navigation from the route navigation server and displays the result in a state where a user requests the route navigation via the application, wherein the program causing a computer to execute: obtaining weather information from the weather information distributing server and marine information from the marine information distributing server; obtaining satellite information from the satellite information distributing server; memorizing weather•marine information obtained by the weather•marine information obtaining unit and analyzed weather•marine information; memorizing satellite information obtained by the satellite information obtaining unit and analyzed satellite information; a user information memory unit that memorizes information relating to a user of the terminal device; performing a route navigation using the weather•marine information and the satellite information in a state where a user requests the route navigation; judging a user of the terminal device; and transmitting and receiving data among the weather information distributing server, the satellite information distributing server, the marine information distributing server and the terminal device.

Note that in order to achieve the above objects as Route navigation system, it is also possible to embody the present invention determining method that includes, as its steps, the characteristic units included in such Route navigation system, and as a program causing a computer to execute such steps. It should be also noted that such program can be distributed on a recording medium such as a USB and over a transmission medium such as the Internet.

Effects of the Invention

The route navigation system comprises a weather information distributing server which distributes weather data obtained from a weather sensor, a marine information distributing server which distributes marine data obtained from a marine sensor, a satellite information distributing server which distributes satellite data obtained from an artificial satellite, a route navigation server which performs route navigation for ships when requested and a terminal device that processes a certain application, and that obtains a result of the route navigation from the route navigation server and displays the result in a state where a user requests the route navigation via the application. With this configuration, the route navigation system provides ships with more accurate, safer, and more economical route navigation by utilizing cloud computation via the Internet.

BRIEF DESCRIPTION OF THE DRAWINGS

FIG. 8 is a diagram showing an initial setting screen when the terminal device uses an application.

FIG. 16($a$) is a diagram showing an example of a Web browser when the terminal device uses the application.

FIG. 16($b$) is the table diagram showing the predicted numerical value.

FIG. 23 is a diagram showing a comparison between the conventional example and the route navigation system according to Embodiment 1.

DETAILED DESCRIPTION OF THE INVENTION

Embodiment

Figure 1:
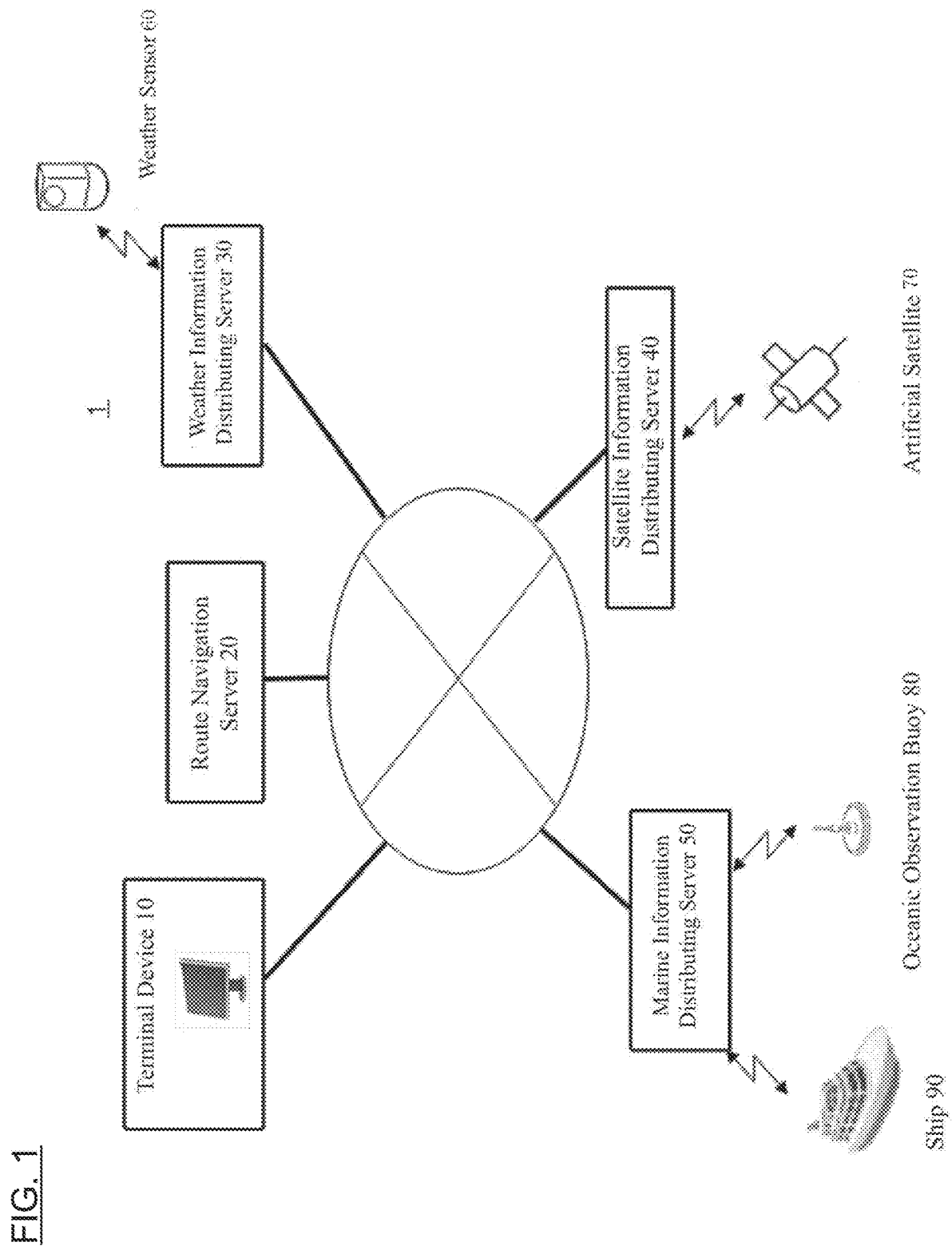
FIG. 1 is a system block diagram showing a route navigation system according to Embodiment 1 of the present invention.

Referring to the drawings, the Embodiment of a route navigation system for ships (hereinafter, it is mentioned as a route navigation system) according to the present invention, will be explained. The route navigation system is a system that provides the most economical and safest navigating route, which is from any port to a destination, to any ships throughout the world via the Internet by utilizing cloud computation.

<The Whole System>

Firstly, the whole system of the route navigation system will be explained. As shown in FIG. 1, the route navigation system 1 according to the Embodiment, comprises a terminal device 10 such as a PC, which is installed in a ship, a route navigation server 20, a weather information distributing server 30, a satellite information distributing server 40, and an marine information distributing server 50, wherein all these are connected to each other via wide area network such as the Internet.

The terminal device 10 is a device such as a personal computer, smartphone, and so on, which is owned by a contractor of the route navigation system 1. The terminal device 10 implements a specialized application, which is installed in the terminal device 10 and displays the result on the screen. This specialized application displays a navigation route and weather/marine meteorology information (such as estimated weather/marine scenario) by using GUI (Graphical User Interface) as a web browser. More specifically, for example, the terminal device 10 obtains a route navigation result, which satisfies certain conditions, from the route navigation server 20 via the network, then it displays an optimum route by using GUI based on said route navigation result by utilizing this specialized application.

For example, the specialized application, which is installed in the terminal device 10, is called "Ocean Navi" provided by the applicant company. This "Ocean Navi" is a visualized web application for a route navigation and is provided to the contractors such as shipping companies. With this application, it is feasible to collect weather, oceanic condition, satellite data information, wherein these information were used to be scattered.

As a result of this, a route navigation based on these big data can be achieved and is easily provided.

In a case when the route navigation server 20 receives a route navigation request in an Http request format and so on from the terminal device 10, the route navigation server 20 obtains future weather/marine forecast and simulates an optimum route for the ship, based on these weather/marine forecast. A typical routing simulation according to the Embodiment is simulated based on weather/marine forecast, ship information, a departure port, an arrival port, GM value, and so on, which will be mentioned below.

The weather information distributing server 30, is a server that provides measuring/forecast information relating to weather conditions by the Meteorological Agency. This server 30 distributes observation data by a weather sensor 60, which is owned by the Meteorological Agency and weather forecast. These meteorological data include temperature, atmospheric temperature, wind velocity, and so on. The weather sensor 60 owned by the Meteorological Agency is, for example, a field sensor wherein it is located in various places. This field sensor comprises various sensors that can collect meteorological data such as temperature, humidity, rainfall, the quantity of solar radiation, airflow, and so on. The field sensor also comprises a camera sensor, which can observe weather conditions. The weather sensor 60 establishes a communication session by using a certain communication protocol to transmit or receive information.

The satellite information distributing server 40 provides various observation data scanned by a satellite 60, which is operated by NASA (National Aeronautics and Space Administration)•NOAA (National Oceanic and Atmospheric Administration)•ENVISAT (Environmental Satellite), and so on.

As an international standard, the marine information distributing server 50 provides ship observation data (wave/wind/swell data from about 80,000 number of ships), which are transmitted from an oceanic observation buoy 80 (actual observation data at 4,000 points around the world) and ship 90. Herein, high accuracy ocean current analysis has recently been achieved by processing satellite observation data from a plurality of artificial satellites.

The way to communicate data is defined by a common data format among the terminal device 10, the route navigation server 20, the weather information distributing server 30, the satellite information distributing server 40, and the marine information distributing server 50 in the route navigation system 1. As a result, it becomes easy to establish high performances. Furthermore, the mechanism of Web API (Application Programming Interface) and so on can be applicable. Web API is one type of many APIs. Web API calls up a program from another outside program, which provides certain function by a computer program that utilizes it. The Web API was created by using Web technology such as Http (Hypertext Transfer Protocol) and so on. Once a request written in HTTP request format is sent to a server, the server discloses a special function defined by Web API from a terminal device via the Internet. The terminal device can receive a processed response format, which is also written in an HTTP response format, from the server. Although this data format is various depending on the API, common image file formats on the web are such as XML (Extensible Markup Language), HTML (HyperText Markup Language), JSON (JavaScript Object Notation) and so on.

<Operating Process of the Whole System>

Figure 2:
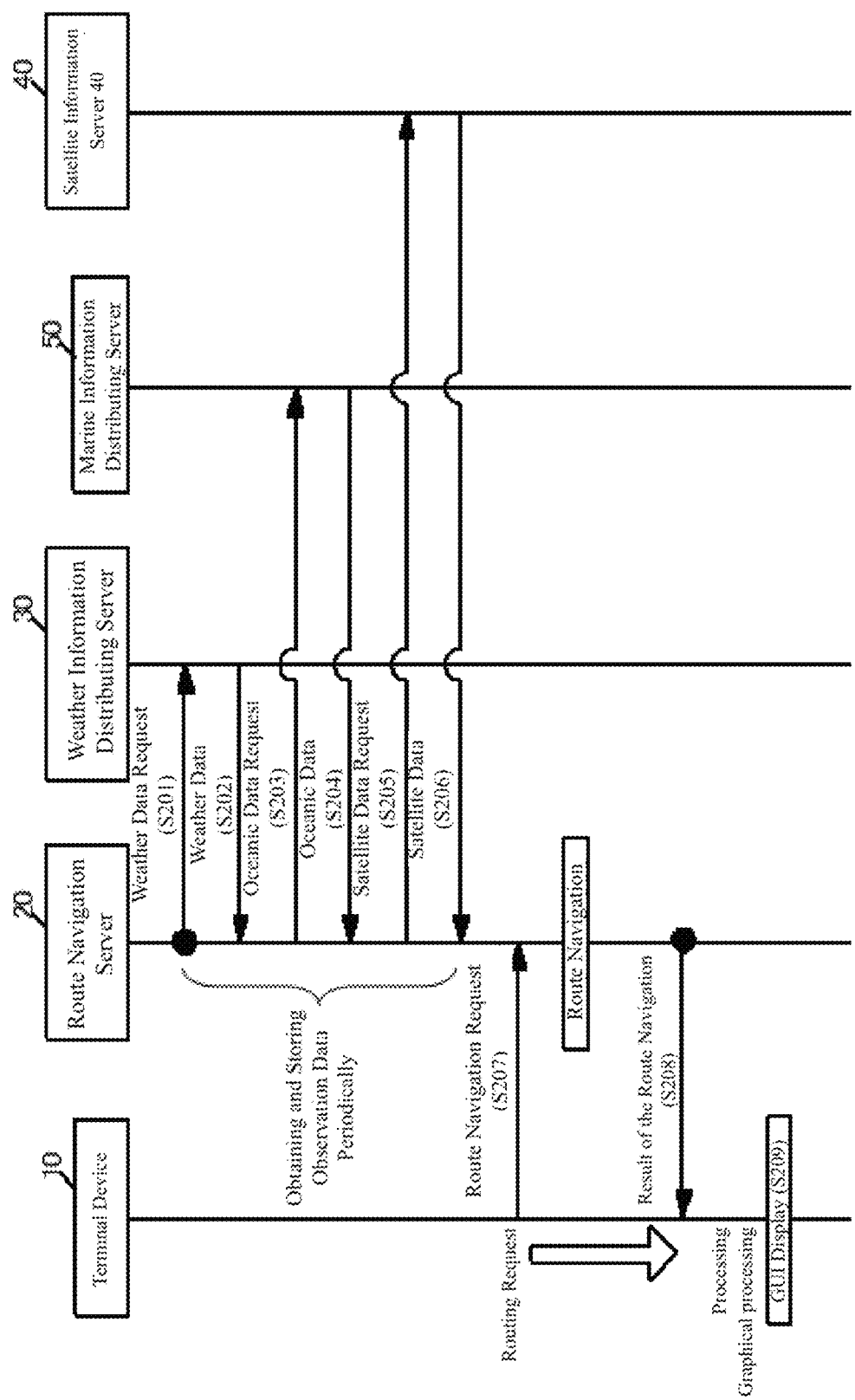
FIG. 2 is a sequence diagram showing the route navigation system.

Next, the whole operating process of the route navigation system 1 will be described, referring to FIG. 2.

First, the route navigation server 20 sends a weather data request (S201), which is written in Http request format, to the weather information distributing server 30. Then, the weather information distributing server 30, which received the weather data request, distributes weather data to the route navigating server 20 (S202). In the same manner, the route navigation server 20 sends an oceanic data request (S203), which is written in Http request format, to the marine information distributing server 50. Then, the marine information distributing server 50, which received the oceanic data request, distributes oceanic data to the route navigation server 20 (S204). In the same manner, the route navigation server 20 sends a satellite data request (S205), which is written in Http request format, to the satellite information distributing server 40. Then, the satellite information distributing server 40, which received the satellite data request, distributes satellite data to the route navigation server 20. In other words, the route navigation server 20 obtains and memorizes actual observation data in advance at a certain period interval.

Next, in a state where the route navigation server 20 receives a route navigation request from the terminal device 10 (S207), the route navigation server 20 calculates and creates an optimum route based on weather, marine scenario and transmit back the result to the terminal device 10 (S208). Lastly, the terminal device 10, which received the optimum route written in Http response format (XML), operates a process by a specialized application. Then the terminal device performs a graphical process and then displays the optimum route as GUI so that the user can view the optimum route on the screen of the terminal device 10.

Figure 3:
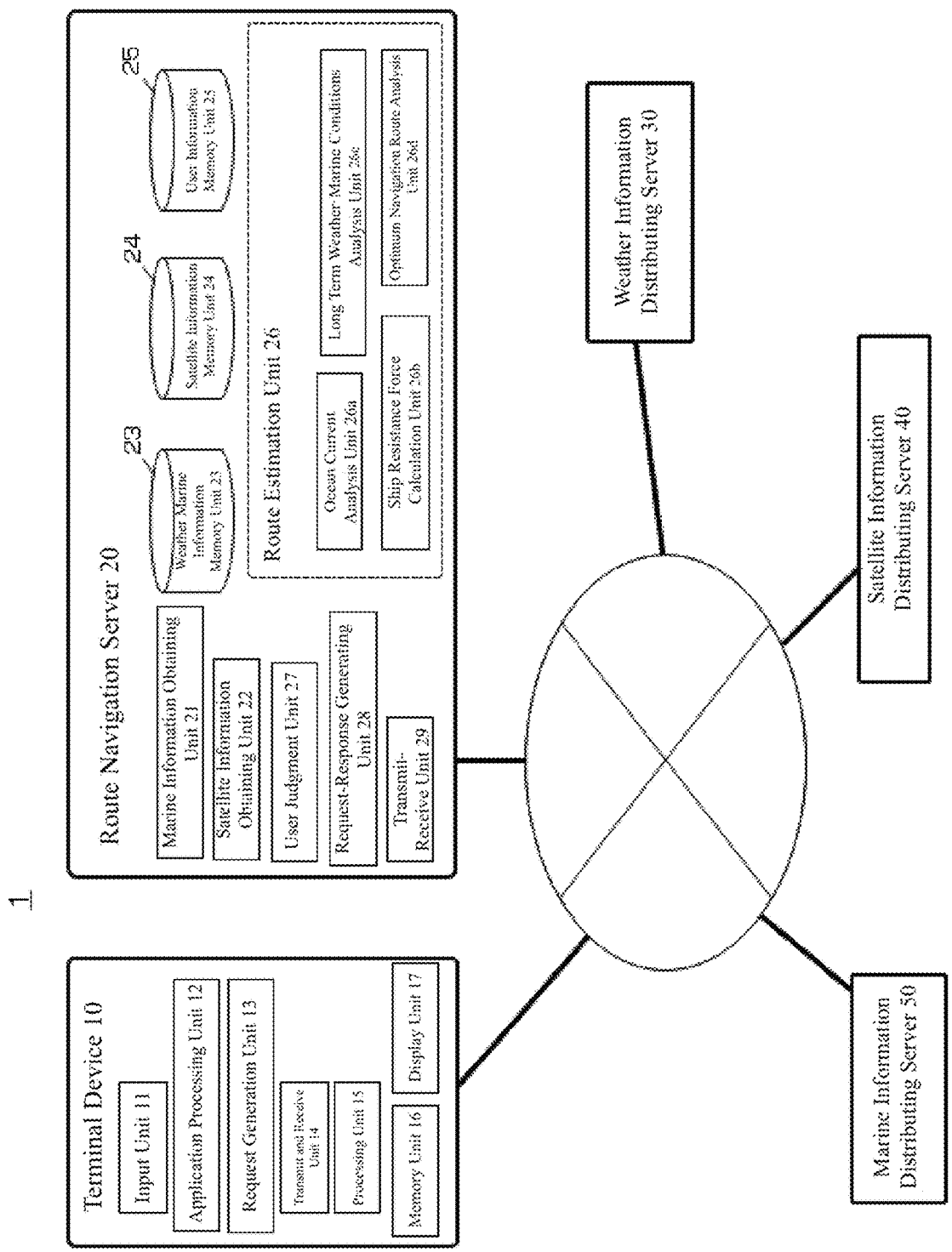
FIG. 3 is a block diagram showing the route navigation system.

Next, the function block diagram of each processing unit in the route navigation system 1, according to the Embodiment, will be described as referring to FIG. 3.

<Functional Block Diagram of the Route Navigation Server>

The route navigation server 20 responses to a route navigation request from the terminal device 10 and generates an optimum route and transmit said optimum route to the terminal device 10. The route navigation server 20 also searches, computes, and generates data, then changes its data format to XML, etc, and sends them to the terminal device 10. More specifically, the route navigation server 20 is a computer such as a server or workstation and provides routing services by using a cloud computation.

The route navigation server 20 comprises weather•marine information obtaining unit 21, satellite information obtaining unit 22, weather•marine information memory unit 23, satellite information memory unit 24, user information memory unit 25, route navigation unit 26, user judgment unit 27, request-response generating unit 28, and transmit-receive unit 29.

The weather•marine information obtaining unit 21 obtains information relating to weather, marine information from the weather information distributing server 30 or the marine information distributing server 50 periodically. This information includes wave height, wind speed, wind direction, temperature, atmospheric pressure, and so on. The obtained information is memorized in the weather•marine information memory unit 23.

The satellite information obtaining unit 22 obtains satellite data, which is sent from the artificial satellite 60, wherein the data is sent from the artificial satellite 60 to the server 40. The obtained information is memorized in the satellite information memory unit 24. Herein, the satellite information obtaining unit 22 may obtain satellite information by utilizing a specialized satellite receiving antenna or a receiving analysis processing facility.

The weather•marine information memory unit 23 is a memory unit such as a hard disk and memorizes received weather•marine information, and analyzes past weather•marine information. The satellite information memory unit 24 is a memory such as a hard disk and memorizes various satellite data, which were analyzed and processed by a satellite's technology, for more than the last 15 years. The user information memory unit 25 is a memory such as a hard disk and memorizes contractor's information and ship-specific information, and so on, which are related to an identifier and a password, as table information.

The user judgment unit 27 compares received identification, password with memorized identification, password stored in the user information memory unit 25, in order to judge a user of the terminal device 10. In a case when a received identification, password is identical to the memorized identification, password, the route navigation information will be provided. In a case when a certain request from the terminal device 10 is received, the request response generating unit 28 instructs the route estimation unit 26 to respond to the certain request, and transmits the result, which is written in Http format, to the terminal device 10. The transmit-receive unit 29 transmits and receives data among the weather information distributing server 30, the satellite information distributing server 40, the marine information distributing server 50, and the terminal device 10.

The route estimation unit 26 implements a certain program and comprises, oceanic current analysis unit 26a, long term weather•marine conditions analysis unit 26b, ship resisting force calculation unit 26c, and optimum navigation route analysis unit 26d. Furthermore, in a state where a route navigation request is sent from the terminal device 10, the route estimation unit 26 estimates a navigation route based on weather, marine information, and satellite information.

<Oceanic Current Analysis Unit>

The oceanic current analysis unit 26a conducts global-scale ocean current analysis by making use of various global environment satellite analysis (NOAA•NASA•ESA, etc). More specifically, the oceanic current analysis unit 26a analyzes about global ocean current direction (16 directions), current speed (cm/s), mesh (an area of 33 km in each direction), which is based on satellite information obtained from satellite information obtaining unit 22 and the observation information of weather•marine information obtained from the weather•marine information obtaining unit 21, while using cloud removal patent technology (Japanese patent No. 3233623). In other words, the oceanic current analysis unit 26a can achieve a global analysis (each lattice point of the mesh) of wind, wave, swell strength, direction, angle, and so on.

<Long Term Weather•Marine Conditions Analysis Unit>

The long term weather•marine conditions analysis unit 26b provides future weather marine scenario based on the past meteorological data. This long term weather•marine conditions analysis unit 26b is operable to process big data such as the Meteorological Agency data, satellite analysis data (NASA•NOAA•ESA 7 to 10 of satellite units analysis processing), data from oceanic observation buoy, ship observation data, etc. More specifically, the long term weather•marine conditions analysis unit 26b generates future weather•marine scenarios based on satellite information, which is obtained from the satellite information obtaining unit 22, various weather•marine observation data, which is obtained from the weather•marine information obtaining unit 21, data memorized in the weather•marine information memory unit 23, and data memorized in the satellite information memory unit 24.

The long term weather•marine conditions analysis unit 26b can perform not only short term weather•marine 240 hours estimation, but also weather•marine data analysis technology development, which can provide global oceanic wave•wind•swell•ocean current analysis, which applies to long term voyage (one~two months), by utilizing various analysis technologies relating to big data processing. For example, the long term weather•marine conditions analysis unit 26b generates weather data as an average value of the past data, and a estimated scenario referring to past similar data tendency guided from the present year's tendency.

Ten days estimation data from the departure date will be introduced as a weather•marine data from the weather distribution server 30. However, this route navigation system 1 performs correlation calculation of wave•wind•swell•atmospheric pressure•ocean current analysis after the eleventh day and provides 30 days later navigation estimation based on the big data analysis relating to weather•marine satellite data from NASA, NOAA, ECMWF, and so on. As a result of this, this route navigation system 1 can contribute to energy-saving and safe voyage, and influence more precise ship navigation.

Furthermore, in the Embodiment, a detailed algorithm for generating weather scenario by the long term weather•marine conditions analysis unit 26b will not be explained. The program, which is performed by the long term weather•marine conditions analysis unit 26b, generates weather scenarios considering short term weather forecast at each mesh point. Then the program also generates estimation scenarios, which can minimize the uncertainty of weather•marine by mixing various weather•marine data obtained form the weather distribution server 30, and so on. In addition, the Meteorological Agency provides medium and long term forecast (seasonal forecast: one month forecast, three months forecast, warm season forecast, cold season forecast) as a weather forecast. By making use of this seasonal forecast, it is possible to fix and adjust a seasonal forecast to provide more accurate simulation. It is needless to say that AI can be applicable to this forecast scenario generation.

<Ship Resistance Force Calculation Unit>

The ship resistance force calculation unit 26c analyzes a resistance force against ship by utilizing modulate function•control function, which are required for the calculation of the resistance force against unspecified large numbers of ships. In this Embodiment, the ship resistance force calculation unit 26c performs analysis, which is integrated with seaworthiness theory (Newstrip method), wave resistance increase, vessel rolling control, and so on. More specifically, based on the result from the oceanic current analysis unit 26a and the long term weather•marine conditions analysis unit 26b, the ship resistance force calculation unit 26c performs analysis, which is integrated with seaworthiness theory (Newstrip method), wave resistance increase, vessel rolling control, and so on. Then the ship resistance force calculation unit 26c calculates the resistance force of a vessel by wave•wind•swell•ocean current.

In the Embodiment, the ship resistance force calculation unit 26c upgrades the Newstrip method and calculates all resistance forces of a vessel by wave•wind•swell•ocean current instantly, regardless of the shape, scale, cargo type of the unspecific number of vessels. In addition, we developed a control function, which relates to wave resistance increase, horizontal/vertical acceleration, and threshold control function of wave height•wind force. As a result, the route navigation system 1 can achieve a dual safe voyage. The route navigation system 1 identifies and judges a route navigation request from each ship, whose main articles are such as a vessel's scale/type/engine speed differ from each other. Then it calculates and provides an eco-friendly and safe route according to each ship's conditions. As a result of this, the route navigation system 1 can achieve accurate voyage and response/provide analyzed numeral voyage data to each ship instantly.

Hereinafter, the seaworthiness theory (Newstrip method) will be explained.

(1) In terms of ship movement, there are six free movements, which are PITCHING, ROLLING, SWAY, HEAVE, YAWING and SURGE. In addition to these movements, horizontal/vertical acceleration are also calculated.

(2) In order to calculate these ship movements, the seaworthiness theory, which is called the Newstrip method, is adopted. This method calculates fluid force against a ship.

(3) For example, when a pole fluctuates up and down in the water, ripples will appear around the pole. This ripple transpires water periodically. This transpiration can be bigger or smaller according to the strength of this ripple.

(4) This ripple (fluid force) is calculated at each slice (strip) of one vessel, then all are added so that a swing of one vessel can be calculated. This will become a safe standard, which will be mentioned below when the ship route is calculated.

(5) After having many conducted onboard experiments with measuring apparatuses, it has been concluded that a captain judges vertical acceleration using one's body and then change directions or slow down so as not to exceed 0.5 G of the vertical acceleration.

This seaworthiness theory is useful, because (1) this method is common in all ships regardless of the size or the shape of the ship. (2) Until the present, an accurate resistance force by wave•wind•swell•ocean current has not yet been calculated. In addition, based on each ship, whose type•scale•kind are various, the influences on each ship by weather and marine conditions with high accuracy could not be achieved. In other words, the reduction of knots couldn't be estimated as numerical data when a ship is affected by weather and marine conditions. (3) This invention can achieve the reduction speed of the ship that can be estimated by calculating and analyzing the resistance force according to each vessel's size, shape, types of cargos, and so on. (4) Resistance forces by weather and marine conditions, which affect a ship, are enumerated by number according to direction and strength of wave•wind•swell•ocean current. As a result, resistance forces (reduced forces) of the ship can be referred as numerical data (knot.) (5) The above-mentioned reduced forces are linked to a set engine speed. The numerical data of the engine speed varies with the knot of the ship so that the fuel consumption will be calculated. (6) With this configuration, the fuel consumption for all ships will be calculated according to the weather and marine conditions even if the weather is stormy or calm. In addition, it is possible to calculate the fuel consumption, in a state where the voyage is not only controlled under the acceleration threshold, but also more than the acceleration threshold. It is noted that the actual voyage will be stopped when the acceleration is more than the threshold.

Next, the increasing wave resistance calculation will be explained.

(1) This theory is based on the Maruo theory, which is shown in the equation (1) below. The Maruo theory, which calculates a wave resistance force against a ship using a mathematical function for the first time, introduces the wave resistance force based on an energy theory.

Wave resistance=Wave force against a ship−Emissive force by swaying the ship−Remaining wave force as the ship passes through    (Equation 1)

(2) In particular, cargos and tankers are big ships that have thick bows. Therefore, when waves hit the bows, big reflection waves occur. This force is too big to ignore and can be calculated as increasing wave resistance+reflection wave.

(3) The ship movement and increasing wave resistance can be calculated as mentioned above. Since the ocean has irregular waves, the method called liner overlaying method can be applicable, wherein the method overlaps the irregular waves. Herein, the wave direction against the ship is divided into bow, oblique bow, oblique rear, and rear, then all waves from these directions are overlapped.

(4) In addition, tide or ocean current (kt) is also multiplied in this calculation. Herein, this wave resistance coefficient has different values depending on the wave direction against the ship.

(5) The resistance by wind pressure is calculated by multiplying the vessel projection side area, including the submerged living area, vessel projection front area, wind pressure coefficient (experimental equation) and wind force (m/s). Herein, this wind resistance force coefficient has different value depending on the wind direction against the ship.

Globally, wave height sometimes reaches 4~5 m in stormy areas during winter. In a case when a ship is expected to go through said stormy areas, the route navigation companies instruct the ship to take a big detour. This is because the precise threshold for unsafe sway degree is still unknown among these companies. As a result, in many cases, fuel consumption will be increased by 20~50% by taking such a detour. Recently, fuel consumption for voyage has been regulated drastically. This year, IMO decided to decrease fuel consumption by more than 20% from 2020. The route navigation system 1 according to the Embodiment can avoid stormy areas and select the smallest resistance force route by making use of the above-mentioned increasing wave resistance calculation. This route navigation system 1 can achieve an eco-friendly and safe voyage to decrease fuel consumption drastically.

Calculation Example

Figures 4A, 4B:
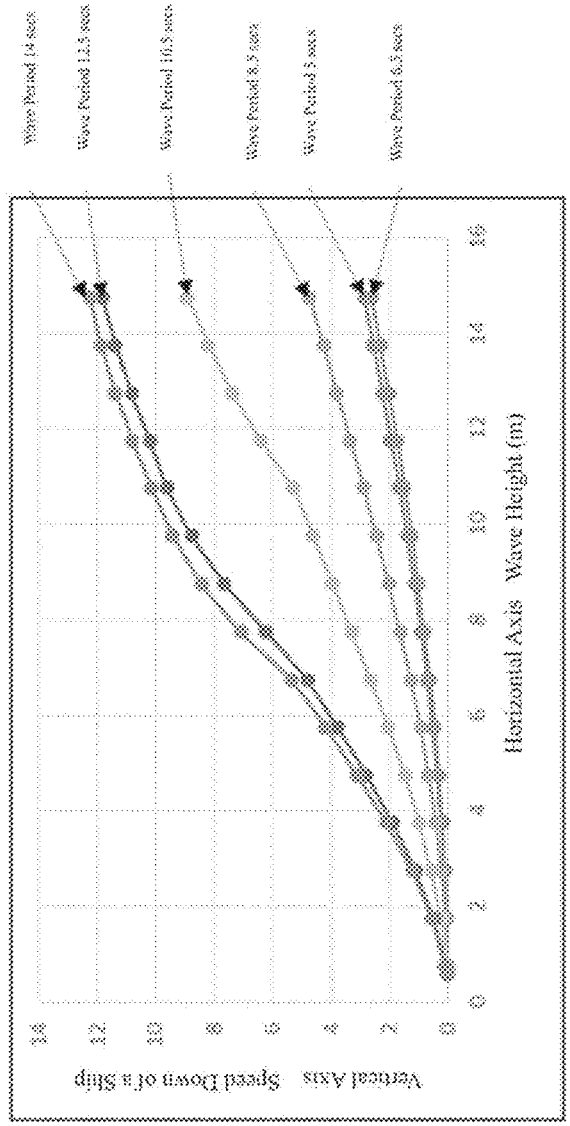
FIG. 4($a$) and FIG. 4($b$) are diagrams showing an example of table information, which is used for a route navigation server of the route navigation system to perform a route calculation.

Next, a calculation example by the ship resistance force calculation unit 26c will be explained by referring to FIG. 4~6. The ship resistance force calculation unit 26c obtains wave heights (m) and wave periods at each mesh point from the ocean current analysis unit 26a and the long term weather•marine conditions analysis unit 26b. Then the ship resistance force calculation unit 26c calculates the increasing wave force by referring to the table (in a case for bulk carrier, adverse wind) shown in FIG. 4 and estimates a decreasing speed value of the ship. The route estimation unit 26 can estimate not only wave height but also wave periods at each mesh point so that the accuracy of the decreasing speed value of the ship will be improved. Furthermore, this table in FIG. 4 is a case only for 180-degree adverse wind. However, there are tables according to all 32 directions. By taking the wave•wind direction (Deg) from the ship into the calculation and automatically being calculated, more accurate influencing forces by wind and waves (Wave/Wind(kt) (decreasing speed value) against the ship can be calculated at each mesh point.

In addition, the ship resistance force calculation unit 26c obtains wave heights (m) and wave direction (Deg) at each mesh point from the ocean current analysis unit 26a and the long term weather•marine conditions analysis unit 26b. Then the ship resistance force calculation unit 26c calculates the increasing wave force by referring to table 501~504 shown in FIG. 5 and estimates vertical acceleration (V Acceleration) and horizontal acceleration (H Acceleration). The route estimation unit 26 can estimate not only wave height but also horizontal acceleration and vertical acceleration at each mesh point so that the accuracy of estimation of the unsafe voyage areas will be improved.

What is more, the ship resistance force calculation unit 26c obtains wave height and said vertical acceleration (V Acceleration) at each mesh point. Then the ship resistance force calculation unit 26c calculates pitch degree (Pitch (Deg)) by referring to FIG. 6(a) and FIG. 6(b) and calculates rolling degree (Roll(Deg)) by referring to FIG. 6(c) and FIG. 6(d). The route estimation unit 26 can estimate not only wave height but also the pitch degree and the rolling degree at each mesh point so that the accuracy of route navigation will be improved.

Furthermore, the ship resistance force calculation unit 26c calculates the decreasing ship speed amount by connecting the numerical data of the set engine speed to the ship's knot. As a result, the ship resistance force calculation unit 26c calculates fuel consumption(ton/day). It is noted that fuel consumption is in proportion with the cube of speed.

Figures 5A, 5B:
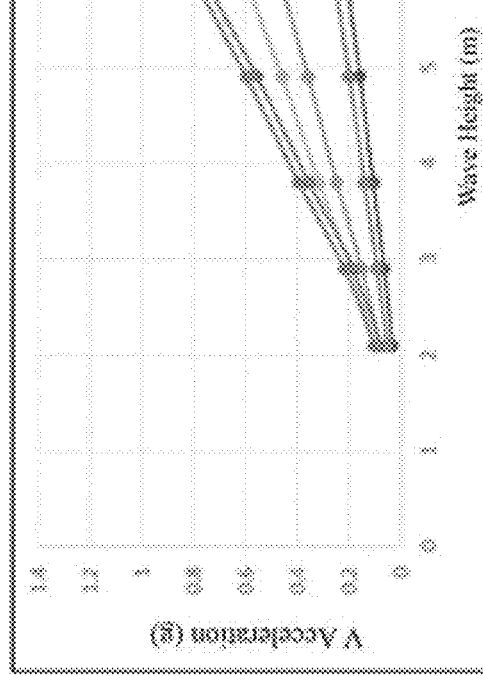
FIG. 5($a$)~5($d$) are diagrams showing an example of the table information.
Figure 5C:
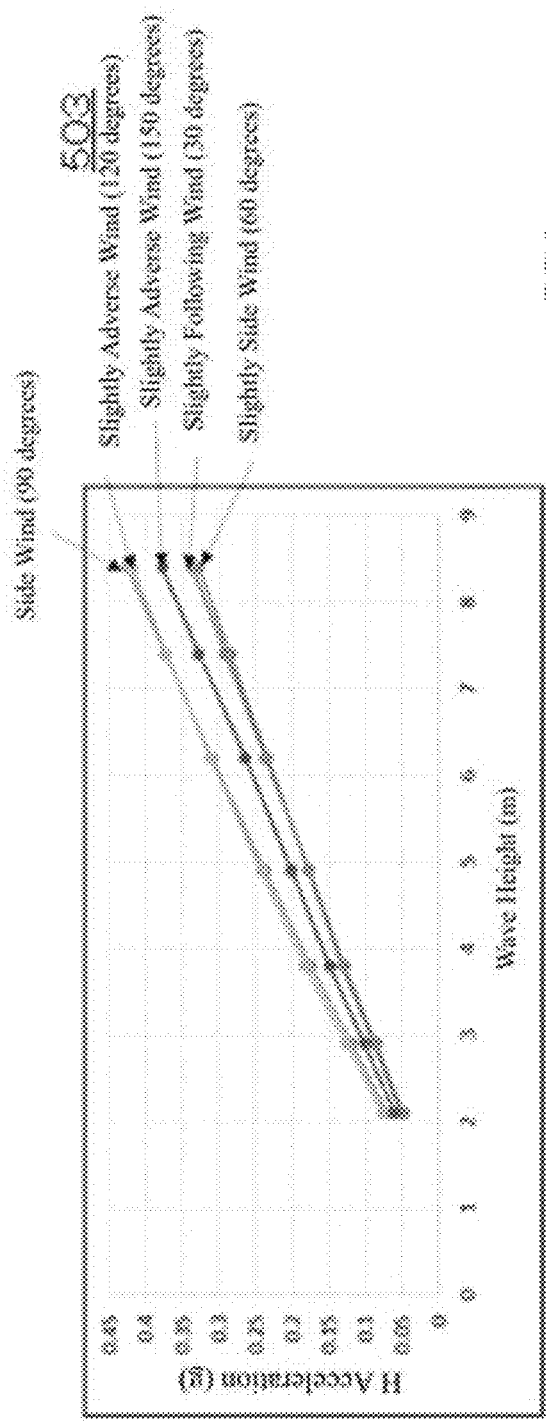
Figure 5D:
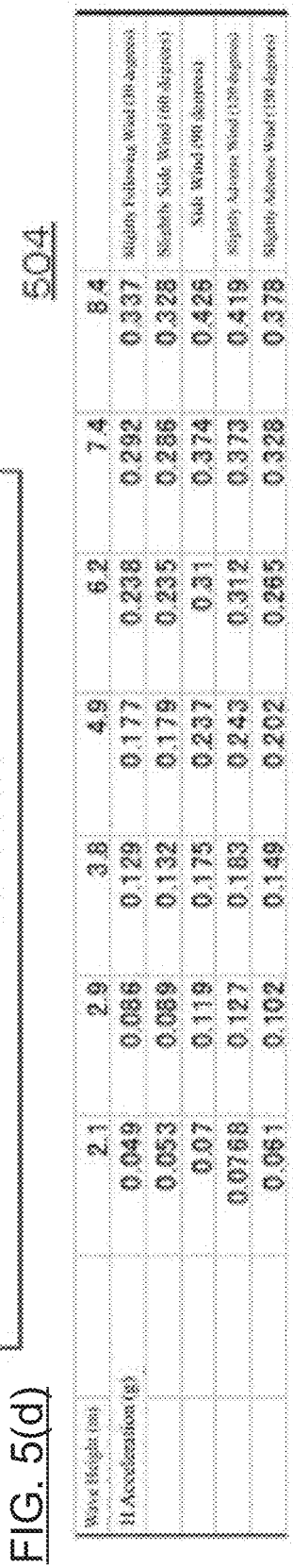
Figure 6A:
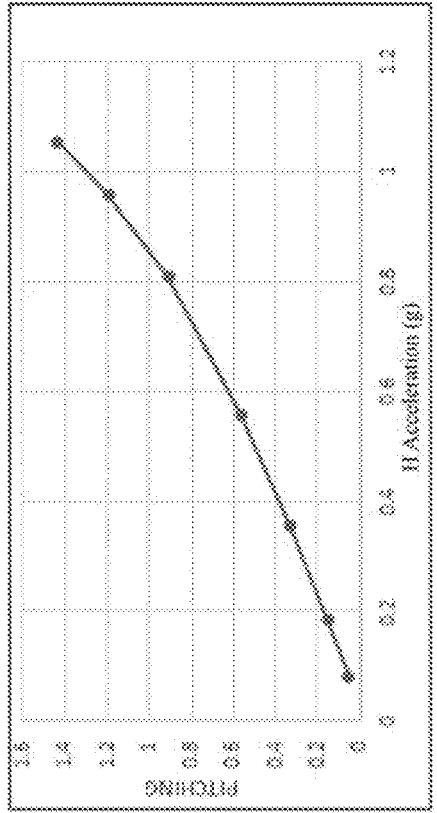
FIG. 6($a$)~6($d$) are diagrams showing another example of the table information.
Figure 6B:
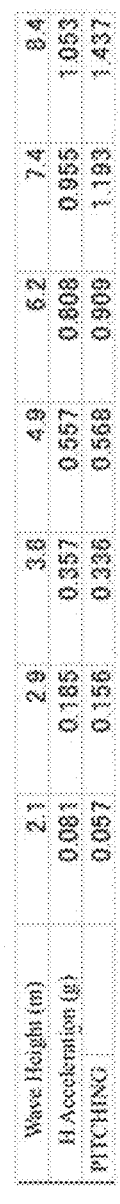
Figure 6C:
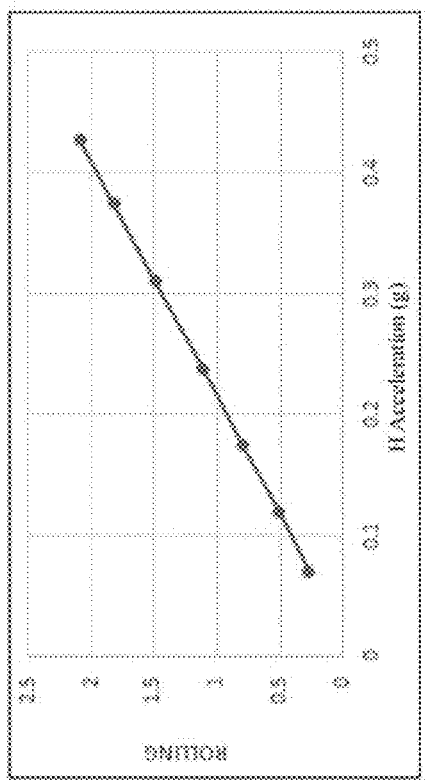
Figure 6D:
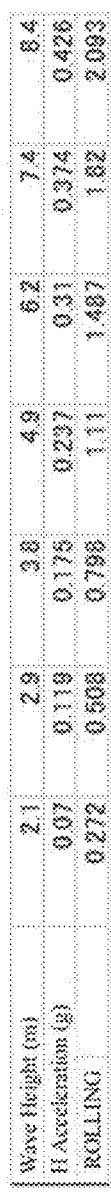

Furthermore, the estimation table information, which is shown in FIG. 4-6, are prepared not only for container ships but also for car cargos, bulker, tanker, LGB gas cargo and so on. The appropriate table information is already stored according to the ship's specification data. Therefore, more precise route navigation can be achieved by reflecting each ship's specification data to the resistance forces against the ship.

As mentioned above, according to the Embodiment, the route navigation system 1 has more accurate estimations than conventional systems. In Europe and even Japan, major navigation companies (Weather news Co., Ltd. In Japan and Applied Weather Technology Co., Ltd. In the US) have been sharing the global ship route navigation weather information. Although these two companies have been operating this business for more than 50 years, the total share among these two companies is less than 10%, which is very small. In a word, because the conventional route navigation systems heavily depend on human intuitions and experiences, economical merits for ocean voyage are very little in terms of the prices and accuracies. These conventional route navigation companies use statistically decreasing ship speed curves, which are called Performance Curve (decreasing speed curve by waves) for each ship type. However, this curve has to do with both wave height and decreasing ship speed only. This curve has nothing to do with wave period, irregular waves, vessel movement, vessel acceleration, ocean current and wind pressure. As a result, the accuracy of the conventional route navigation is much less than the route navigation system 1 according to the Emdobyment.

<Optimum Navigation Route Analysis Unit>

The optimum navigation route analysis unit 26d utilizes big data analysis technology and voyage route search technology•various data search analysis technology. The optimum navigation route analysis unit 26d is a high accuracy analysis technology that mixes weather data such as using Dynamic Program Dijkstra's Algorithm with various global observation satellite big data. The optimum navigation route analysis unit 26d utilizes analysis result by oceanic current analysis unit 26a, long term weather·marine conditions analysis unit 26b, and ship resisting force calculation unit 26c. As a result, the optimum navigation route analysis unit 26d carries out optimum route navigation using Dynamic Program Dijkstra's Algorithm. Herein, since route navigation with the minimum fuel consumption by Dynamic Program Dijkstra's Algorithm is widely known, the detailed explanation of the algorithm will be omitted.

The optimum navigation route analysis unit 26d (1) adopts Dynamic Program Dijkstra's Algorithm, which calculates the fastest. This algorithm is suitable for seeking the shortest route navigation. (2) Simply speaking, each route (mentioned as distance, period, fuel consumption) is summed one by one. For example, provided that the route is a navigation period, the shortest summed period will be the navigation period after comparison. (3) In addition, as a safety standard, the shortest summed period with more than the acceleration threshold at each point will not be chosen. This is our company's unique technology. (4) By using the above mentioned Dynamic Program Dijkstra's Algorithm, our original acceleration control system plays an important role in having a safe voyage to the destination with the lowest fuel consumption. When a ship catches huge waves during navigation, the ship starts to sway a lot in left/right and up/down motions. Under the circumstances, the voyage may suffer load collapse or vessel damage, resulting in a dangerous voyage. (5) Our invention can control V Acceleration/H Acceleration less than 0.5~0.8 G according to the type of the ship, such as cargo ship, tanker, container, car-carrying vessel, and so on. Consequently, our method can provide safe voyage with the smallest fuel consumption under any meteorological conditions.

With this Dynamic Program Dijkstra's Algorithm, (1) the optimum navigation route analysis unit 26d provides more accurate route navigation by mixing the Newstrip method with the wave resistance increase and mixing the below-mentioned weather marine analysis processing technology with the data. (2) Conventional route navigations are mainly based on the isochronous curve method that calculate only the shortest period. Since these conventional methods cannot calculate fuel consumption, a safe voyage and acceleration control, said methods just achieved avoiding a stormy area by taking a detour. With this method, the shortest period route only passes through calm areas. (3) This is because the isochronous curve method judges the route based only on wave height, this method cannot take resistance forces, which affect the vessel, into the route calculation. As a result, when the recommended route is expected to head towards a stormy area and a captain starts to contact the navigation company, the navigation company usually advises to take a detour in order to go to a calm area. (4) The route navigation system 1 fractionalizes the earth surface into the maximum 2 million meshes by using Dynamic Program Dijkstra's Algorithm and forecast the weather marine (including ocean current) conditions according to each mesh. Consequently, the route navigation system 1 calculates resistance forces against individual ships during voyage based on the precise weather marine data. (5) In addition, all ships in the world can obtain the necessary information by using communication devices on the ship via the Internet, when it is necessary. (6) Furthermore, Dijkstra's Algorithm calculates the smallest fuel consumption route. A safe voyage can be calculated by mixing the Newstrip method with the wave resistance increase. (7) In addition, when a 100 fuel tons reduction is required, it can be input into the Dynamic Program. Then, as an example, the result shown on the display can be a 1.25 Knot speed down and 12 hours arrival delay. The accuracy is more than 90%. Conversely, when a required arrival time has to be within 8 hours, the 8 hours earlier arrival can be input into the Dynamic Program. Then, the result of required 0.8 Knot speed up and 40 tons more fuel consumption will be on the display (various control systems available). This cannot be achieved by the isochronous curve method. Thus, the route navigation system 1 can achieve more than 20% energy-saving by using various control technology, which is one of the advantages of the Dynamic Program Dijkstra's Algorithm. Furthermore, when the ship encounters stormy areas causing to change routes, the route navigation system always provides a safe and energy-saving route.

<With Regards to GM Value>

Herein, the GM value will be explained. The route navigation system 1 provides more detailed supports to small ships by fractionalizing the meshes. In other words, (1) in terms of small cargos within 10,000~50,000 ton classifications, the type of the cargo affects the navigation route and the chances to encounter a dangerous voyage is greater. (2) Furthermore, coexisting cargoes have different varieties. The gravity center position of the ship is determined by using a predetermined coefficient, the amount of carrying load in each 3~4 hatches divided in front, rear, right, and left of the vessel and the weight of the load. It takes more time and it also causes calculation errors. These errors would bring about riskier stormy voyage and dangers. (3) The route navigation system 1 achieves instant automated calculation by inputting GM (gravity metacenter) value and the distance value between the gravity center position and the restoration center position to shipboard PC. (4) In particular, when a variety of cargos such as granary and steel manufactures is loaded together, the route navigation system 1 controls automatically rolling and heave movement within the threshold according to each ship by inputting GM value (the center point of the ship carrying loads). As a result, this route navigation system 1 can prevent load collapse and provide a safe voyage. In addition, since the route navigation system 1 calculates precise fractionalized mesh and detailed acceleration, more precise ship motion can be calculated. As a result, this route navigation system 1 can prevent load collapse while providing energy-saving and safe voyage during the navigation.

<Functional Block Diagram of the Terminal Device 10>

Next, the functional block diagram of the terminal device 10 will be explained. The terminal device 10 is such as a personal computer. The terminal device 10 comprises an input unit 11 such as a keyboard accepting input information from the user, an application processing unit 12 that performs a specialized application in the form of a Web browser to perform route navigation, a request generation unit 13 that generates a route navigation request to the route navigation server 20 when a route navigation request is required from the user via the input unit 11, a transmit and receive unit 14 that transmits a request (route navigation request) to the route navigation server 20, a processing unit 15 that performs GUI display based on the navigation result when the navigation result is received from the route navigation server 20, a memory unit 16 and a display unit 17 that displays GUI using such as a liquid crystal display.

More specifically, the application processing unit 12 processes the application using a Web browser to display the result. The request generation unit 13 requests (Http request) using Http protocol and the like according to the user's input information via the input unit 11 to the program performed by the route navigation server 20. The Http request data format from the transmit and receive unit 14 is written in XML and the like.

The transmit and receive unit 14 receives the navigation result, which is the result of the route request from the route navigation server 20 as an Http response. The processing unit 15 reads XML received from the route navigation server 20 and processes the result of the route navigation scenario and displays the result using GUI on the display unit such as a liquid crystal display.

The memory unit 16 is a memory storage that stores the contractor's ID, password, and other information of the contractors to perform the application.

<Operational Steps of the Terminal Device>

Figure 7:
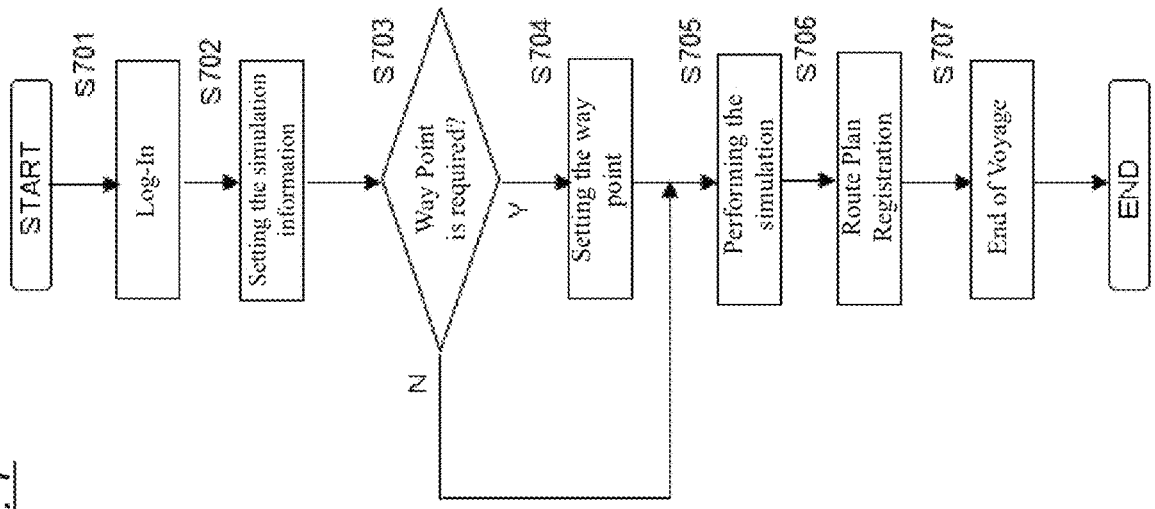
FIG. 7 is a flowchart showing a flow of a terminal device of the route navigation system.
Figures 9A, 9B:
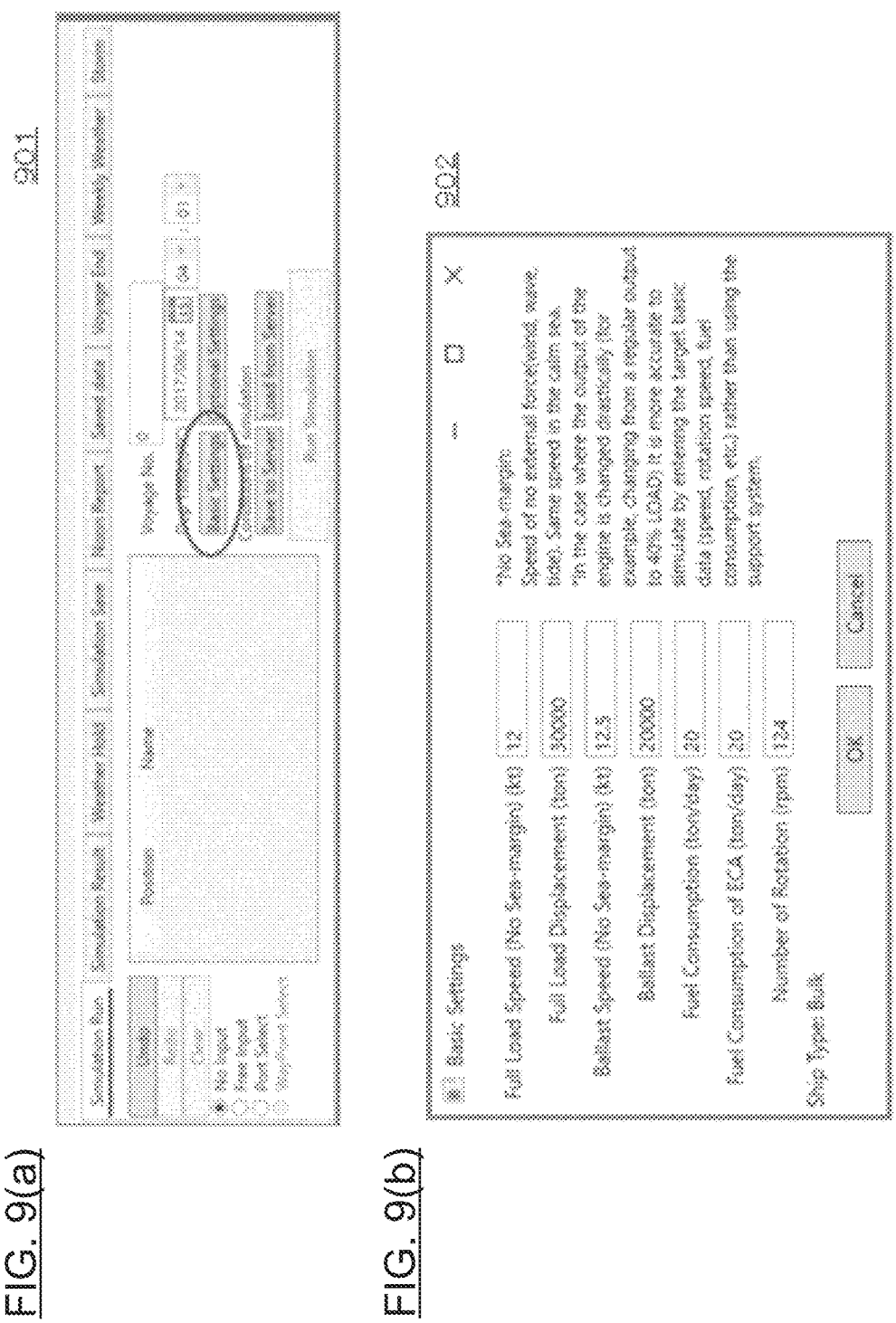
FIG. 9($a$)~9($b$) are diagrams showing an example of a Web browser when the terminal device uses the application (Basic settings).

Next, one example of the operational steps of the terminal device 10 will be explained as referring to the flowchart shown in FIG. 7. After completing the initial setting registration, when the specialized application is started by the terminal device 10, the login set-up is displayed on the screen. The application requires inputting the username and the password (S701).

Next, the user of the terminal device 10 is required to set simulation information such as a departure port, arrival port, basic information (speed, engine speed (rpm), fuel consumption (ton/day)), and cargo type (S702). In addition, in a state where "way point", where the ship is required to pass by a specific point, is necessary (yes in S703), the way point is set (S704). Next, the simulation of the optimum route is performed (S705). After the simulation, the registration of the Route Plan is reported to the route navigation server 20 (S706). Lastly, after the voyage, information relating to the voyage is reported to the server 20 (S707).

<Screen Transition of the Terminal Device 10>

Next, the screen transition of the specialized application by the terminal device 10 will be explained referring to FIG. 8~FIG. 20. Herein, it is supposed that a contractor of the application operated by the terminal device 10 starts to request optimum route navigation using web browser.

As shown in 801 in FIG. 8, firstly, a contractor of this application has to do an initial registration in order to set a ship specification information, ID, and password. The ship specification information includes the ship name, FULL LOAD speed (kt), FULL LOAD displacement weight(t), HEAVY BALLAST speed(kt), HEAVY BALLAST displacement weight(t), horsepower(kw), fuel consumption (ton/day), engine roll per minutes (rpm), cargo type, storage factor, the date of the production, IMO number and the like.

After the initial registration, the contractor of the application, such as ship companies, starts to boot the application in the terminal device 10 when it is necessary. More specifically, after inputting the user name and the password, the contractor can log in to the system, then the main screen of the application appears on the screen.

After the log-in, the user of the terminal device 10 refers to the display and set the simulation information. The user of the terminal device 10 selects "basic setting" on the screen 901 shown in FIG. 9(*a*) and inputs the departure port, arrival port, basic information (speed, rpm, fuel consumption), cargo type, and the like.

As mentioned above, the route navigation system 1 identifies and calculates information relating to each ship and provides an energy-saving•safe route according to each ship that can access to a cloud computation, wherein each ship has its own size/type/rpm, etc. The route navigation system 1 is a system to respond and provide weather information, marine information, and accurate analyzed numerical voyage data immediately in order to achieve accurate route navigation.

Figure 10A:
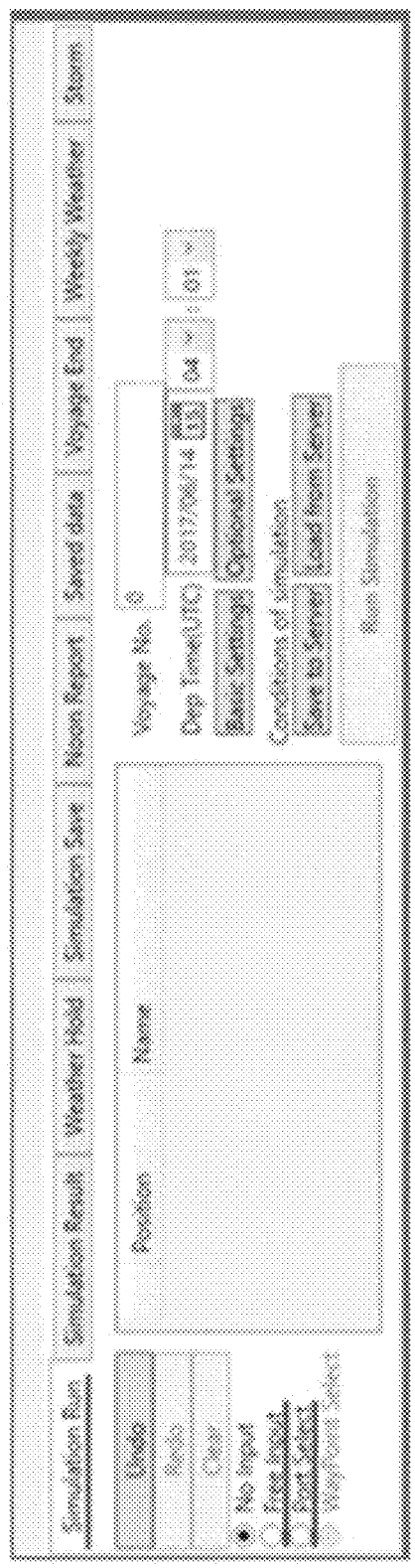
FIG. 10($a$)~10($b$) are diagrams showing an example of a Web browser when the terminal device uses the application (Port select).
Figure 10B:
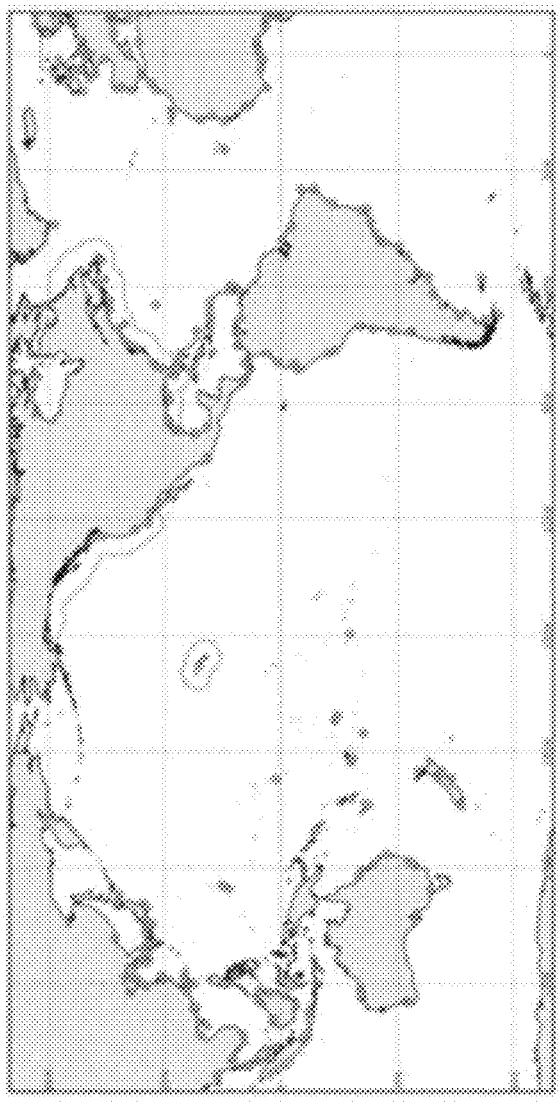
Figure 11:
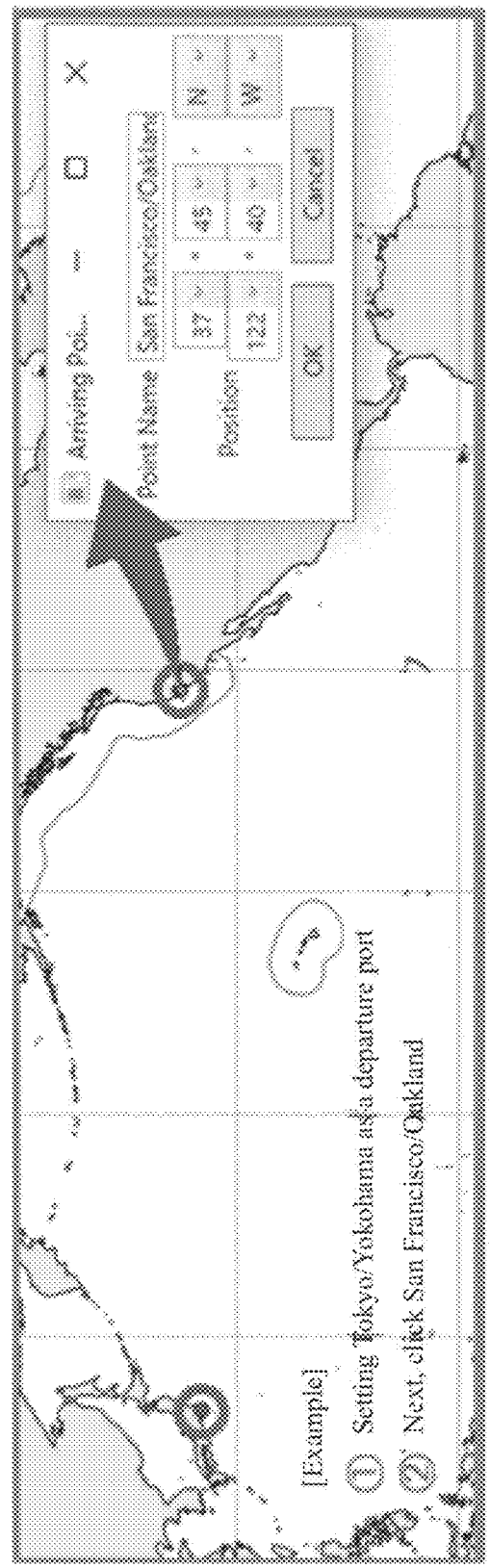
FIG. 11 is a diagram showing an example of a Web browser when the terminal device uses the application (Arriving port select).
Figure 12A:
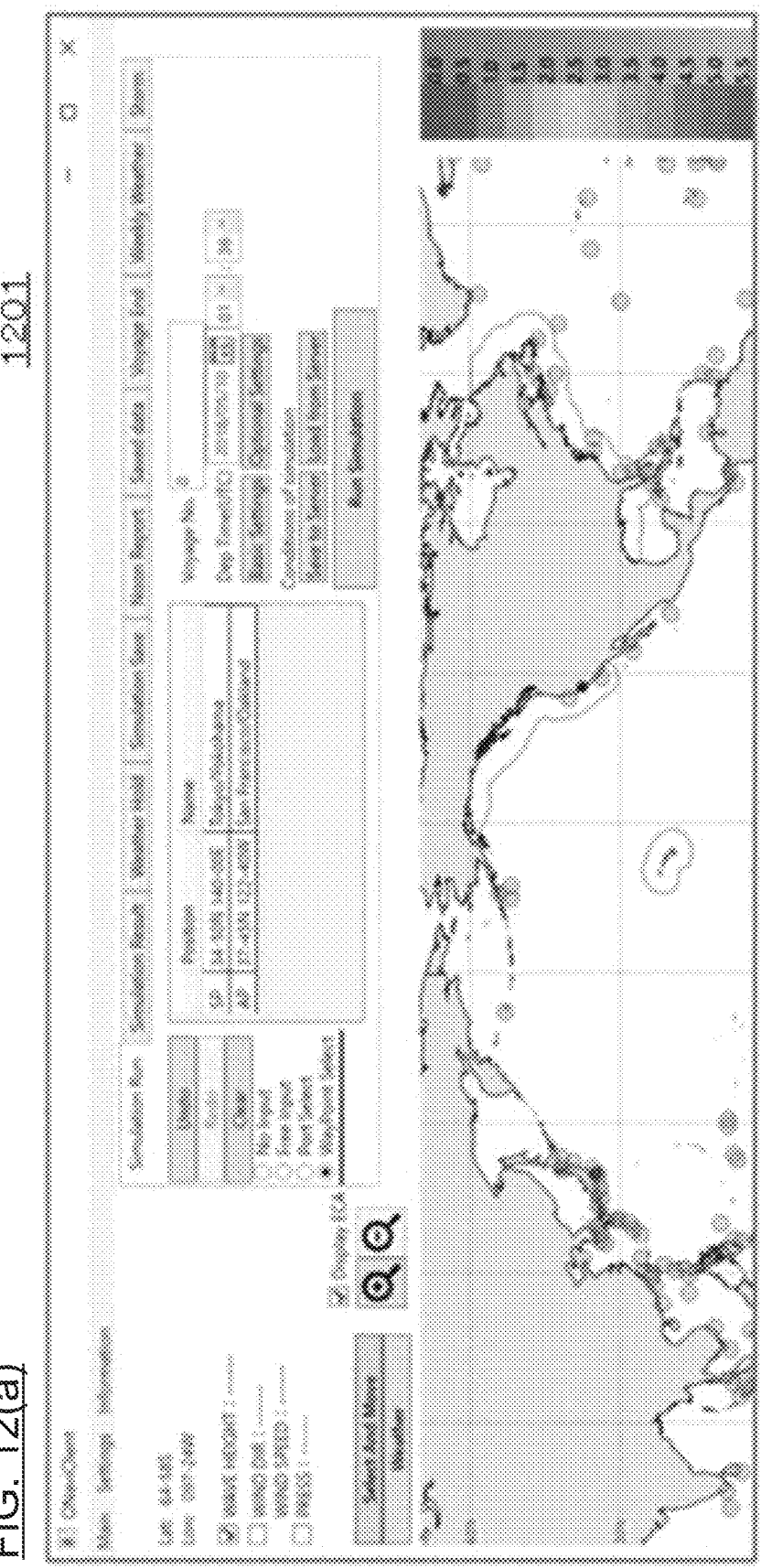
FIG. 12($a$)~12($b$) are diagrams showing an example of a Web browser when the terminal device uses the application (Way point select)

Next, when "Port Select" is selected on the screen 1001 shown in FIG. 10(*a*), registered ports are displayed on the screen 1002 shown in FIG. 10(*b*) and one of them can be set as a departure port. Then the user of the terminal device 10 sets an arrival port. After setting the departure port, the arrival port is set by selecting a point on the map of the screen 1101 shown in FIG. 11. The user can set the arrival port by clicking OK on the "Arrival port" screen 1101 shown in FIG. 11.

Herein, the user of the terminal device 10 can set "Way point" if the ship has to touch other points before arriving at the destination. The "way point select" is chosen on the screen 1201 shown in FIG. 12(*a*) or just select one of the dotted marks on the screen 1202 shown in FIG. 12(*b*). Any ports can be selected as a "Way point".

In terms of "Way point", since the conventional isochronous curve method calculates the shortest period based on the departure point and the arrival point, "Way point" cannot be set using this method. In addition, if "way point" cannot be set freely, global route navigation including the Strait of Malacca, Suez canal, and the like cannot be calculated. Furthermore, when there are dangerous areas, dodging areas, detouring areas during the voyage, setting a "way point" can prevent the ship from entering such areas. In order to achieve an energy-saving voyage and a more precise calculation, the route navigation system 1 fractures the global surface into longitude 1.25-degree×latitude 1.25-degree mesh, what is more, longitude 0.5-degree×latitude 0.5 degrees mesh. Then the route navigation system 1 conducts Dynamic Program Dijkstra's Algorithm and obtains smoother navigation route.

Figure 13A:
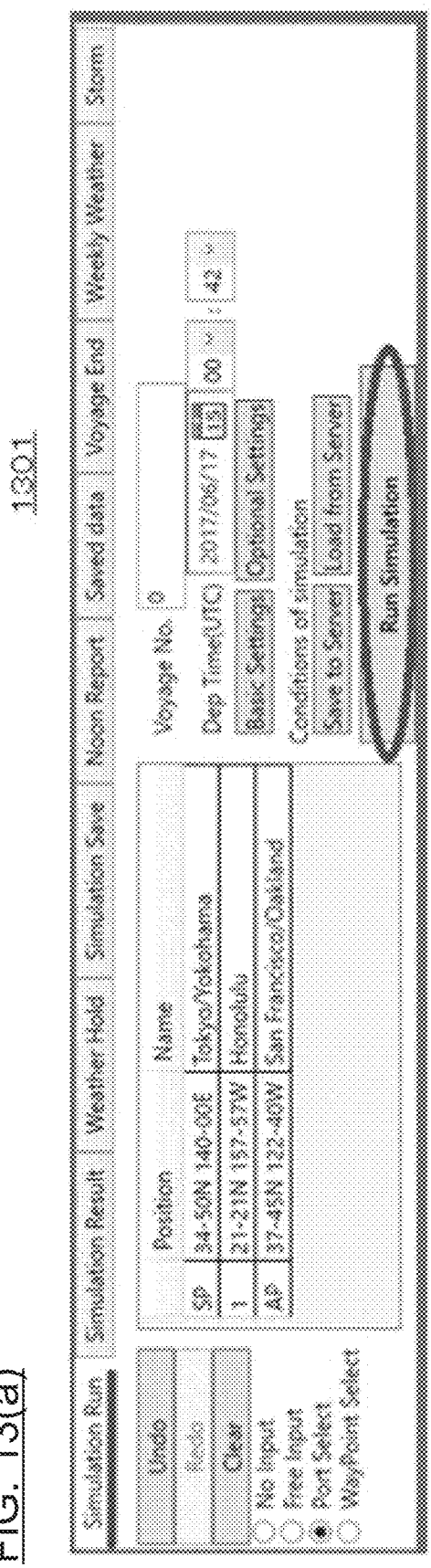
FIG. 13($a$)~13($b$) are diagrams showing an example of a Web browser when the terminal device uses the application (Run simulation).
Figure 13B:
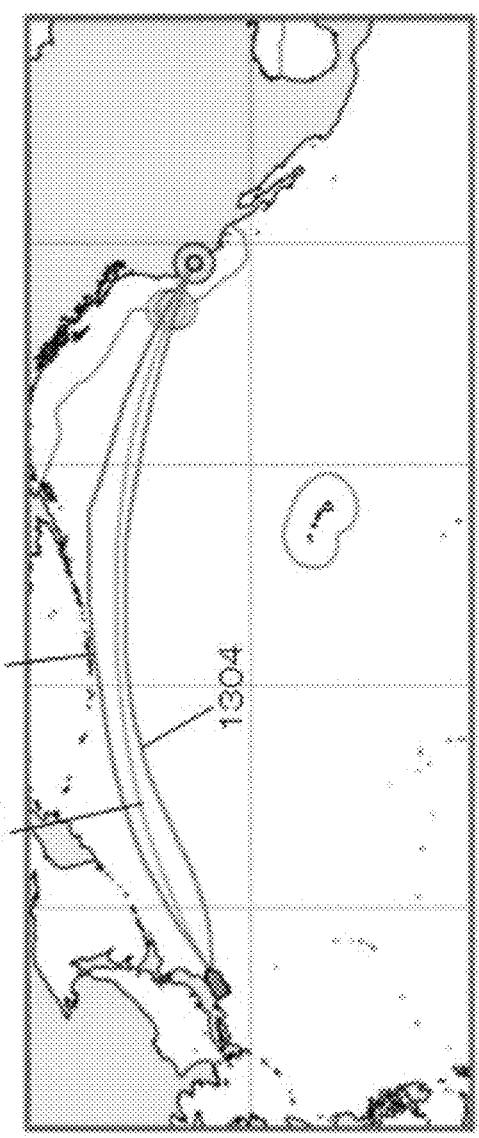

Next, when the user clicks "Run Simulation" in the "Simulation Run" tabs of screen 1301 shown in FIG. 13(*a*), the terminal device 10 sends the route simulation request to the server 20 in the form of an HTTP request and so on.

The terminal device 10 receives the result written in an HTTP response format, XLM data format, and the like instantly, and displays the route on the map having Minimum fuel route 1303, Minimum Time route 1304 and Minimum Distance route 1305 shown on the screen 1302 in the FIG. 13(*b*). Thus, the terminal device 10 can display accurate optimum routes (Minimum fuel route, Minimum Time route, and Minimum Distance route) at the same time on the same screen. In addition, the point interval can be adjustable based on time interval (such as 24 hours gap) or degree interval (5 degrees latitude) and the like as shown on the screen 1402, FIG. 14(*b*).

Figure 14A:
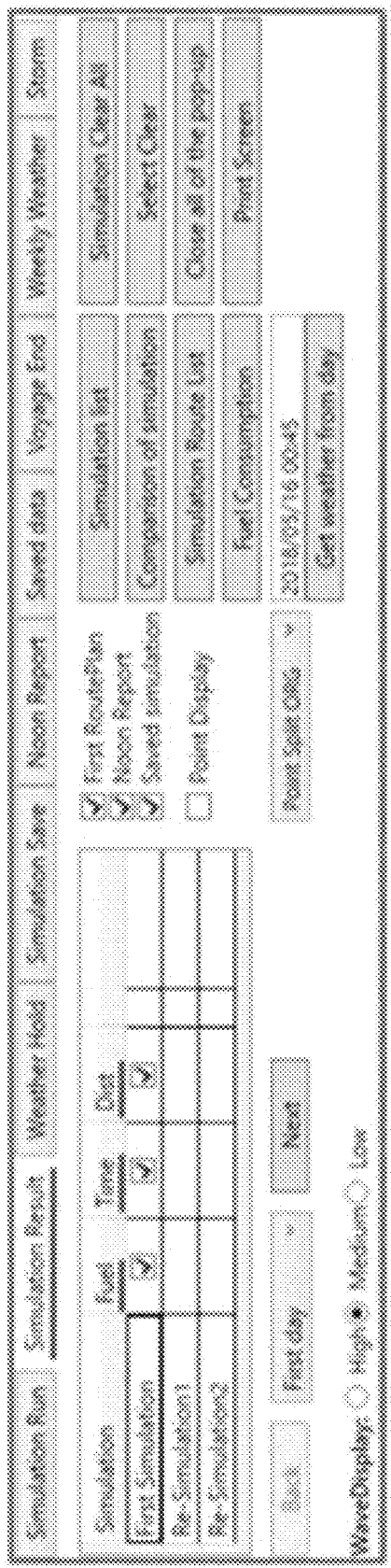
FIG. 14($a$)~14($b$) are diagrams showing an example of a Web browser when the terminal device uses the application.
Figure 14B:
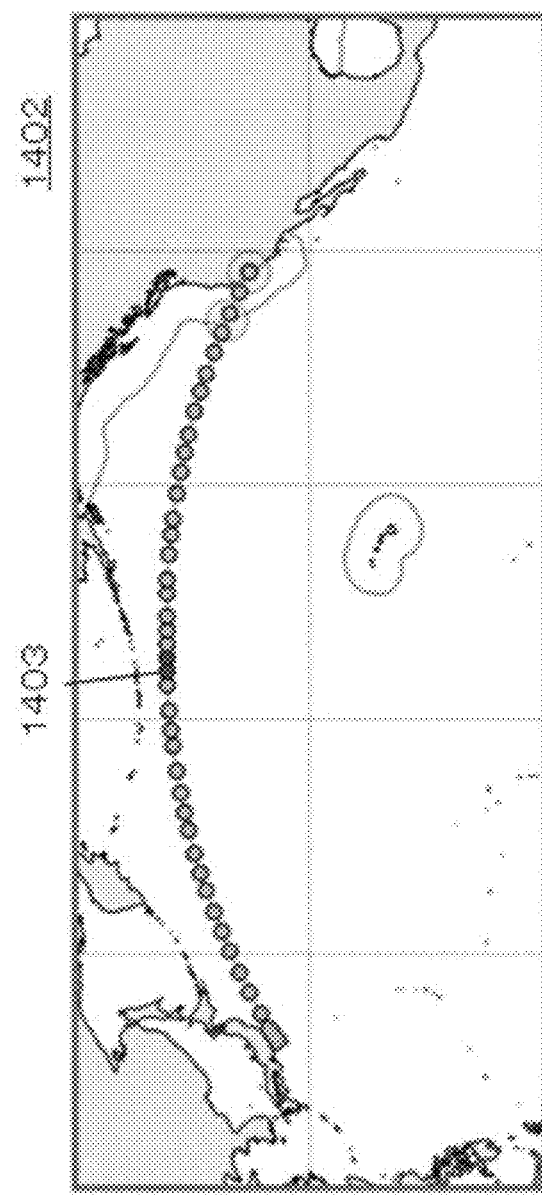

In addition, as shown on the screen 1420, FIG. 14(*b*), the points 1403 that are estimated as dangerous areas (for example, the place having more than 0.5 value of the acceleration) can be colored in a different coloration (such as red). In terms of data transmitted to the ship, the route navigation system 1 provides precisely calculated value data and image data, regardless of the types of the cargoes. In a case when the ship goes through stormy areas during a voyage, automatic computer control will boot and start to warn using red display or on-and-off display based on the pre-setting threshold values such as the threshold value (for example 0.5) of H Acceleration/V Acceleration. As a result, the captain can perceive the danger of cargo collapse or a dangerous voyage. On the contrary, in a state where said conventional method is used, the captain used to be required to seek advice from the navigation company or other staff, which sometimes takes more than one day. In addition, the accuracy is not so reliable and many maritime accidents are still happening.

Figure 15:
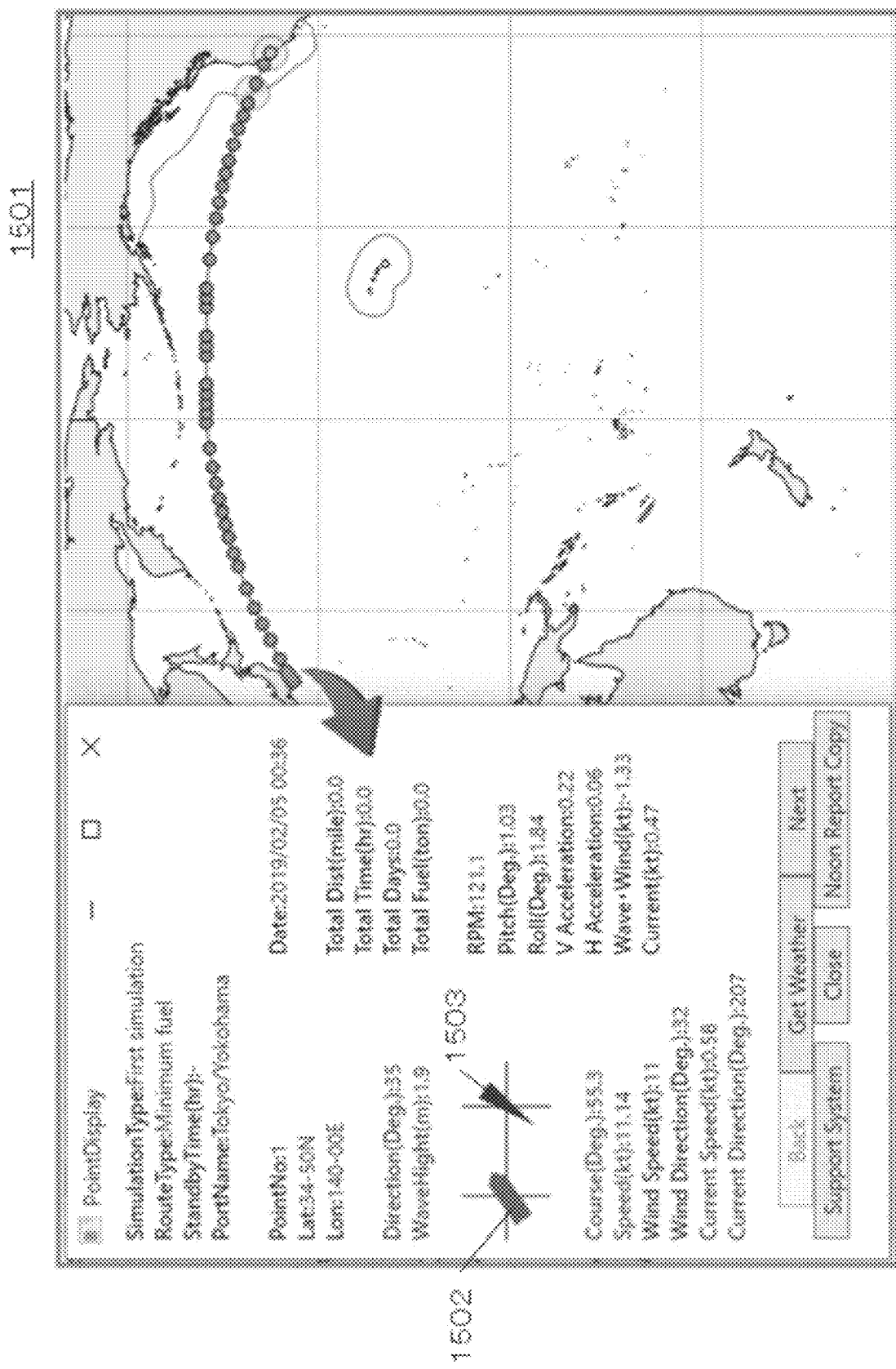
FIG. 15 is a diagram showing an example of a Web browser when the terminal device uses the application.

In addition, as shown on the screen 1501 in FIG. 15, once the point is clicked, the pop-up Point Display, which displays the detailed information of the point, will appear. This pop-up Point Display displays not only position, period, and distance information, but also Course (Deg) 1502 and wave distance 1503 visibly.

In addition, as shown on the screen 1601 in FIG. 16(*a*), the simulation result can be shown not on the map, but as a numeral list. The value includes the information on the list 1602 in FIG. 16(*b*), for example, according to each point number (Point No.) on the map, the position of the ship (Longitude, Latitude), the ship course (Course (Deg.), estimated speed during a voyage (Speed (kt)), days calculated based on hours (Day), voyage distance (Dist. (mile)), fuel consumption (Fuel (ton)), engine speed (RPM), Pitch degree (Pitch (Deg.)), Rolling degree (Roll (Deg.)), Vertical Acceleration (V Acceleration), Horizontal Acceleration (H Acceleration), Sea margin (Sea Margin), Wave•Wind influence on the speed of the ship (Wave•Wind (kt)), Current influences on the speed of the ship (Current(kt)), Wave height (Wave Height (m)), Wave period (Period (s)), Wind direction from the ship (Direction (deg.)). As mentioned above, the route navigation system 1 calculates concrete numerical values such as big waves, wind, period, and current, which affect the voyage of the ship to achieve and control a safe voyage. As a result, the whole resistance forces, which affect the voyage, can be shown as numerical values so that the captain can easily understand the influences. In addition, these lists can be output in the form of a CSV file.

Figure 17A:
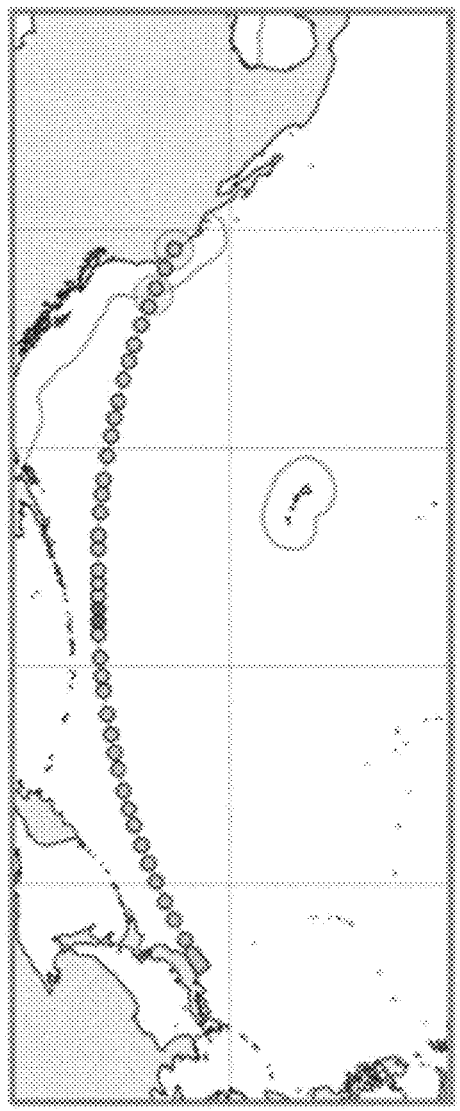
FIG. 17($a$)~17($b$) are diagrams showing an example of a Web browser when the terminal device uses the application (Support system).
Figure 17B:
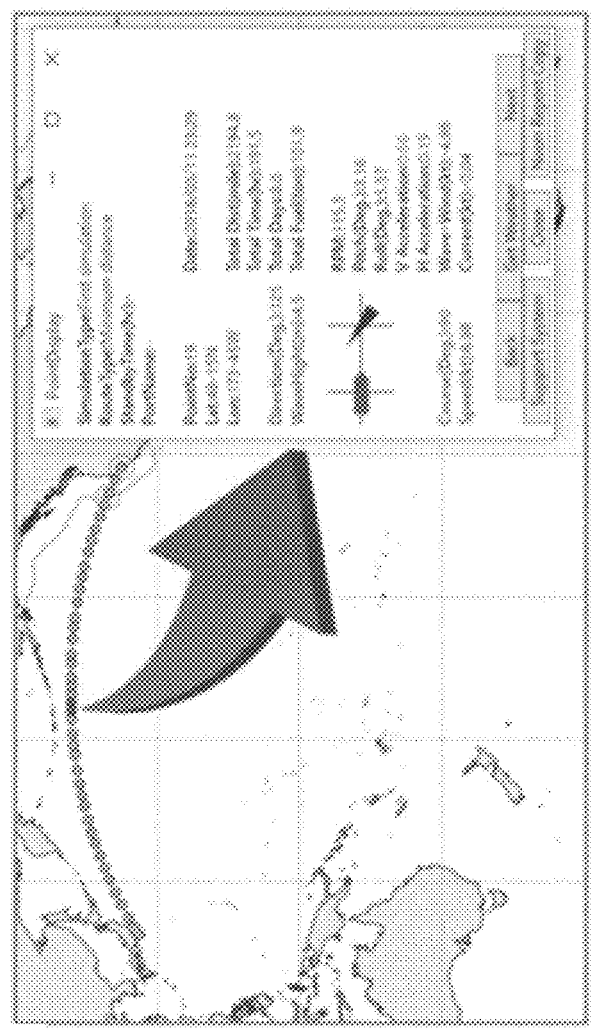

In addition, the "support system" can be applied to avoid stormy areas on the screen 1702 in FIG. 17(*b*). Herein, this support system evades the red points on the screen 1701 in FIG. 17(*a*) automatically and leads the ship to safer areas. This support system can also provide the adjustment of acceleration, time period, fuel consumption, speed, and engine speed.

Thus, in a state where the captain wants to reduce the fuel consumption by 50 tons, the captain inputs the value even during the voyage, and the route navigation system 1 can achieve said energy-saving voyage. In this case, other factors such as speed, arrival time, engine speed, and the like will be automatically adjusted and the captain can check these adjustments on the screen. In a case when the captain wants to arrive at the destination 12 hours earlier, the captain can input the value even during the voyage while other factors such as speed or fuel consumption will be adjusted automatically. In addition, the adjustment of the speed can also be achieved. In this case, as mentioned above, fuel consumption and arrival time will be adjusted automatically.

Figure 18A:
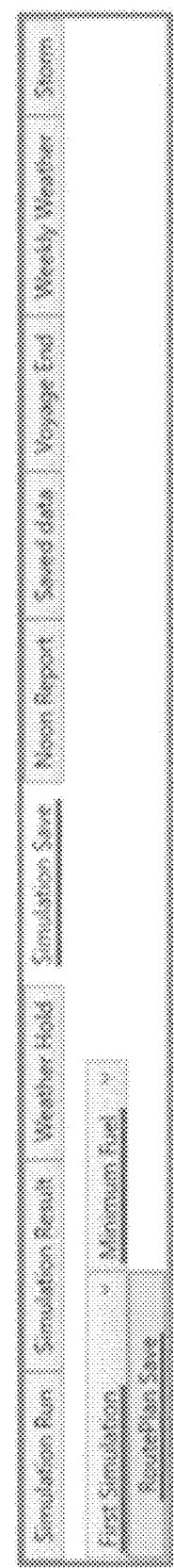
FIG. 18($a$)~18($b$) are diagrams showing an example of a Web browser when the terminal device uses the application (Route plan save).
Figure 18B:
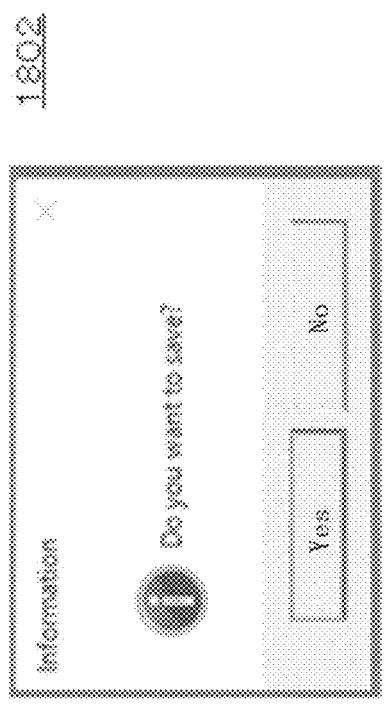
Figure 19A:
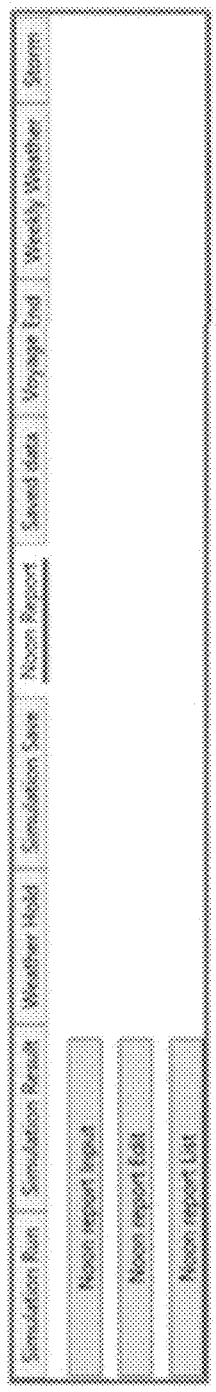
FIG. 19($a$)~19($b$) are diagrams showing an example of a Web browser when the terminal device uses the application (Noon report).
Figure 19B:
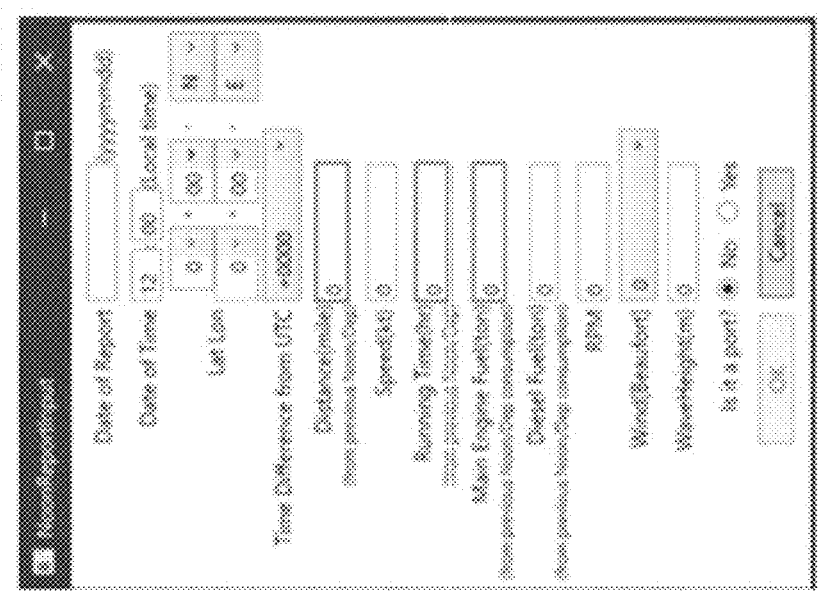
Figure 20A:
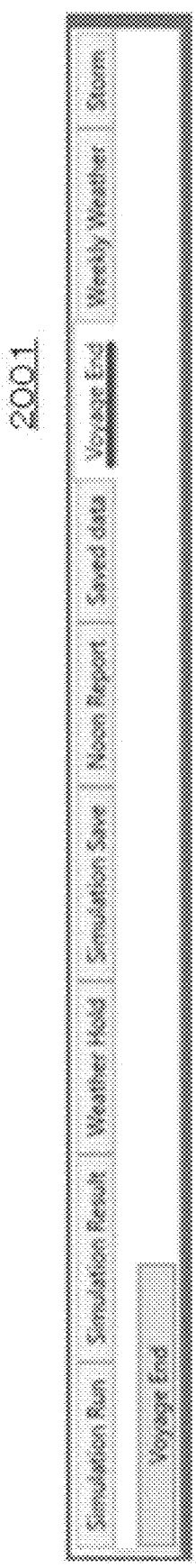
FIG. 20(a)~20(b) are diagrams showing an example of a Web browser when the terminal device uses the application (Voyage end).
Figure 20B:
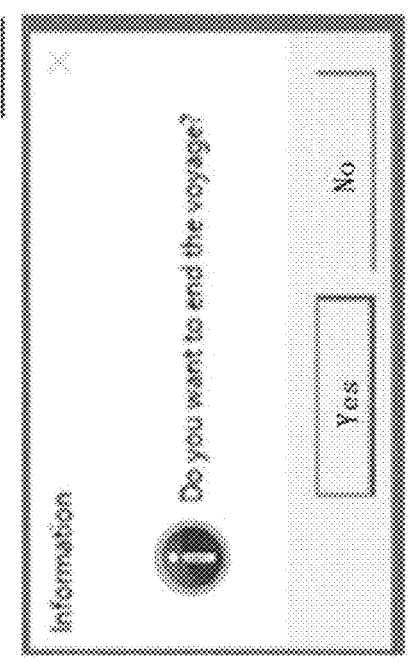

In addition, as shown on the screen 1801 in FIG. 18(*a*), when the route is selected, registration processing "Port plan save" is done. In addition, to achieve safer voyage, "noon report" shown on the screen 1901 in FIG. 19(*a*) is done for reporting the ship information such as current position, and so on. Herein, it is possible to obtain safer route navigation if the simulation is done once every two days and so on. After the voyage, the selection "Voyage end" shown on the screen 2001 in FIG. 20(*a*) will be reported to the route navigation server 20.

As mentioned above, the route navigation system 1 obtains the data immediately for the ship to achieve energy-saving and safe voyage by making use of the support system, in a state where the ship may sail through dangerous stormy areas. The route navigation system 1 judges the current situation of the ship and calculates the necessary value instantly. As a result of this, the route navigation system 1 displays the necessary information such as calculated fuel consumption, remaining voyage period, engine speed, and so on the shipboard PC screen to achieve said energy-saving and safe voyage.

Furthermore, by utilizing the route navigation system 1, the value data including fuel consumption and arrival time displayed on the screen can be shared with the marine branch of the main company. As a result, specialists in the company can refer to the information and decide the optimum route after having a discussion.

As mentioned above, the route navigation system 1 comprises a weather information distributing server 30 which distributes weather data obtained from a weather sensor 60; a marine information distributing server 50 which distributes marine data obtained from a marine sensor (such as oceanic observation buoy and ship observation data); a satellite information distributing server 40 which distributes satellite data obtained from an artificial satellite 60; a route navigation server 20 which performs route navigation for ships by obtaining data from the weather information distributing server 30, the marine information distributing server 50, and the satellite information distributing server 40 when requested; and a terminal device 10 that processes a certain application, and that obtains a result of the route navigation from the route navigation server 20 and displays the result in a state where a user requests the route navigation via the application, wherein the weather information distributing server 30, the marine information distributing server 50, the satellite information distributing server 40, the route navigation server 20 and the terminal device 10 are connected to one another via the Internet.

With this configuration, the route navigation system 1 provides ships with more accurate, safer, and more economical route navigation by utilizing cloud computation via the Internet. In other words, the route navigation system 1 solves (1) the differences of each cargos, ship speed and fuel consumption, (2) the minimum fuel consumption and the optimum route for each ship, (3) responding huge access from various ships and provide the best route to each ship, (4) in order to solve these problems, various ships throughout the world and related companies can obtain energy-saving and safest route from every point on the land or the ocean by utilizing computer system excluding human instinct and past experiences, and have optimum voyage.

Thus, the route navigation server 20 achieved (1) the seaworthiness theory (Newstrip method for various ships), (2) the wave resistance increase calculation (in the stormy areas), (3) the route navigation technology (using the Dynamic Program Dijkstra's Algorithm for safer and eco-friendly voyage), (4) mixing (1)~(3) with below-mentioned technology (new technology making use of the earth observation satellite processing technology, big data analysis processing and ocean current analysis).

The effects of the route navigation system 1 will be mentioned. The route navigation system 1 provides a safer route and energy-saving route to all ships, which access to the cloud server from various ships in the world, instantly via the Internet. The route navigation system 1 can reduce fuel consumption by 20%.

In addition, regardless of the type/size of the ship, even if many ships having different departure ports/arrival ports access at the same timing, the route navigation system 1 can provide three kinds of routes, which are energy saving•safer route, shortest period route, and the shortest distance route.

Furthermore, the method of how to provide these information to each ship can be selected from at least one of an email and the Internet. The ships also may obtain the information using satellite communication line.

In addition, the route navigation system 1 analyzes the energy-saving route, safer route, all marine meteorology and resistance value, which affects the voyage, calculated based on wave, wind, period, ocean current.

And the route navigation system 1 calculates route navigation including the best energy-saving route and safest route for each ship, which has its unique characteristics, regardless of each ship size/speed/voyage period/destination. The route navigation system 1 also displays concrete numerical value on the display of the shipboard PC showing how the wave, wind, period, ocean current are influencing the ship.

In addition, a captain can judge weather the future route is safe or not by seeing the information displayed on the screen of the terminal device 10, wherein the information includes weather/marine meteorology, a ship expected movement (Pitch(Deg.), Roll(Deg.), etc) and acceleration value. Thus, in a state where it is expected that the ship will go through a stormy area, a captain can prepare for cargo collapse to avoid having a marine accident.

Experiment 1

An actual voyage experiment using the route navigation system 1 will be explained below. This actual voyage according to experiment 1 was done with a big container ship owned by a Korean major shipping company called Hyundai merchant ship company. This experiment 1 was an actual experiment, which was done by the Korean container company in November 2018, to compare the AWT route navigation system with our route navigation system.

Having cooperated with Hyundai merchant ship company, this experiment was conducted from Busan new port in Korea to Long beach in West Coast, America. An energy-saving voyage experiment was done using 100,000D/W size of a container ship on Nov. 28, 2018. The conventional routing company provided four days of weather marine forecast every day as usual. The navigation route was shown on the weather map and this process was repeated every day until arrival at the destination. There was no navigation route to the destination from the first day.

On the contrary, the route navigation system 1 provided the whole navigation route to the destination from the first day. The route navigation system 1 provided the necessary information, which includes Knot, engine speed, and original value data by the applicant company, to the container ship whenever it was required. As a result, the 310 tons of fuel consumption reduction was proven in the end. This fuel reduction percentage was 21.85%.

This is because (1) the conventional navigation company expected that this voyage would go through many stormy areas and huge delay would occur. Therefore, this company instructed a much faster voyage to the container ship than usual cases. Furthermore, (2) due to the unexpected storm, the route was forced to change and the arrival date was delayed for one day. What is more, there were stormy areas where it's hard for humans to estimate, which resulted in a huge difference in fuel consumption.

The actual voyage was forced to go through stormy areas from the beginning. Due to this, the ship sailed at more than 21-knot speed more from the first day of the voyage. The speed reached more than the recommended speed so that the fuel consumption exceeded more than usual. In addition, in stormy areas, to make up for the lost time, the ship sailed at the speed rate of 22 and in between knots, which leads to further fuel consumption. This kind of operation has been carried out for many years.

On the contrary, the route navigation system 1 instructed the ship to sail at a stable 20-knot speed from the departure to the arrival. Furthermore, the route navigation system 1 chose the route where the ship could sail at the selected speed. Fuel consumption is in proportion with the cube of the speed. Therefore, having not to speed up or speed down is the most effective for fuel saving. This kind of calculation cannot be determined by human judgment.

With this result, the route navigation system 1 analyzes and provides energy-saving and safer voyage route with stable speed, and achieve drastic fuel reduction (for example, the reduced cost for 310 tons fuel would be around 20,000,000JPY). In addition, since the chances of a voyage encountering stormy areas increases during wintertime after December, further fuel saving can be achieved. The big influence of this fact impacts not only huge cargos but also car cargos, bulker, tanker, LGB gas cargo, and so on.

Experiment 2

Figures 21A, 21B:
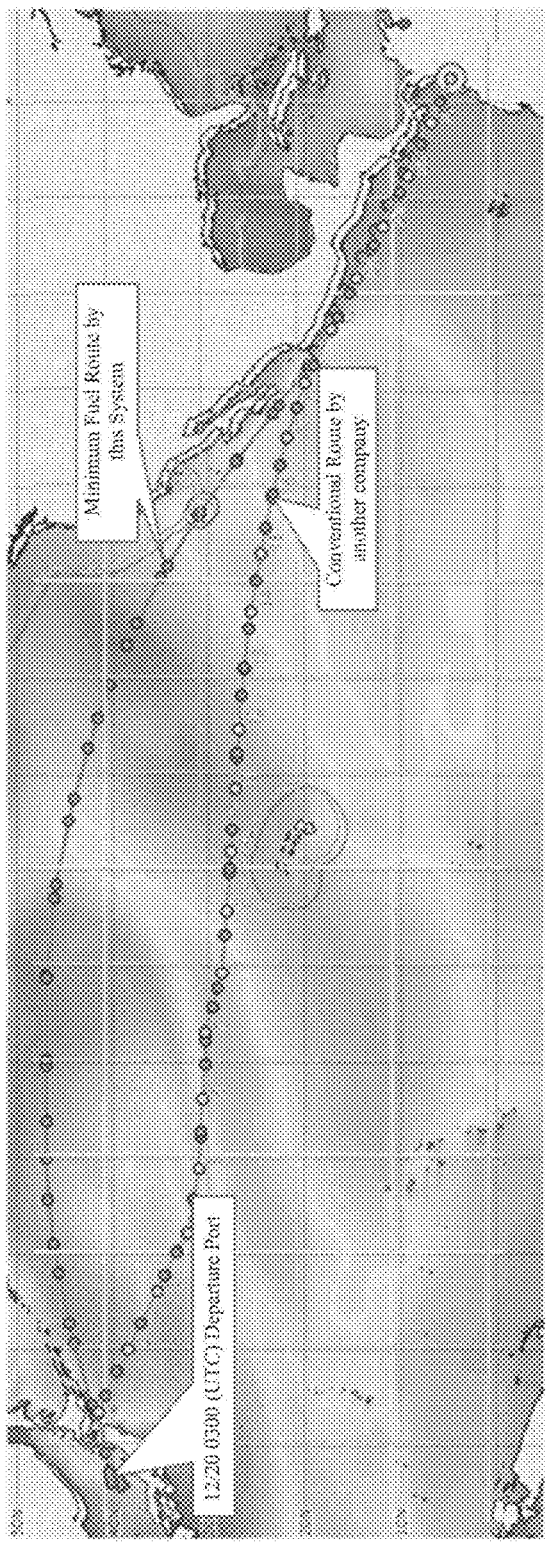
FIG. 21(a)~21(b) are diagrams showing an example of a screen by the route navigation system.
Figure 22:
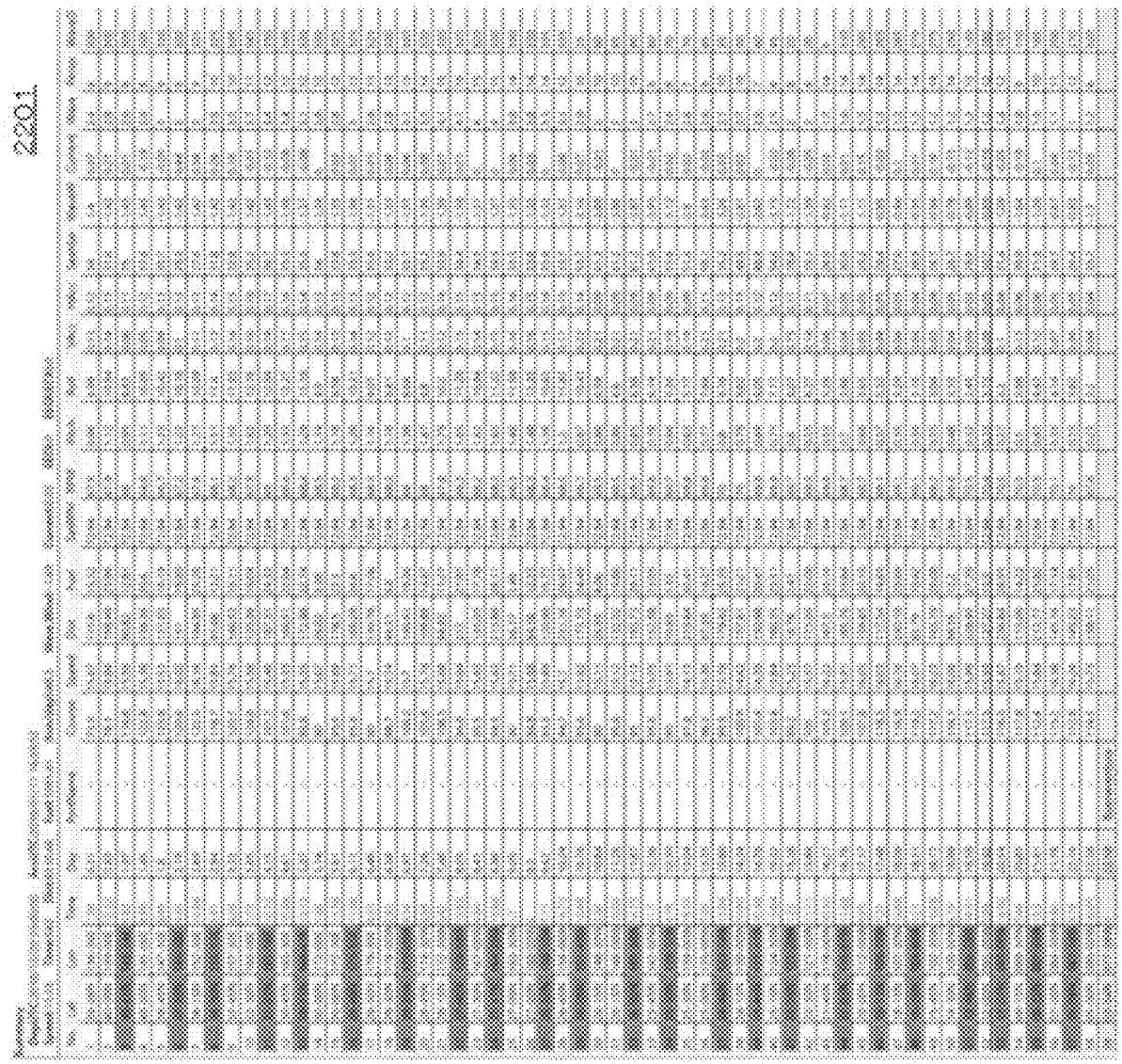
FIG. 22 is a diagram showing a list of predicted values by the route navigation system.

An actual voyage experiment 2 will be explained by referring to FIG. 21-23. Firstly, the user of the terminal device inputs the basic information relating to the ship such as speed, rpm, fuel consumption, cargo types as shown on the screen 2101, FIG. 21(*a*). Then the simulation was performed after selecting the departure port and the arrival port. The result is shown on the screen 2101, FIG. 21(*b*) and the numerical value list 2202, FIG. 22. The color difference in the FIG. 21(*b*) shows the difference of the wave height. Herein, the route calculated by the route navigation system 1 is very different from the route selected by the conventional routing company. What is more, the voyage comparison shown on the list 2301, FIG. 23 shows that the route selected by the route navigation system 1 achieved 199 tons of oil reduction, regardless of having the same amount of days.

Experiment 3

Figure 24:
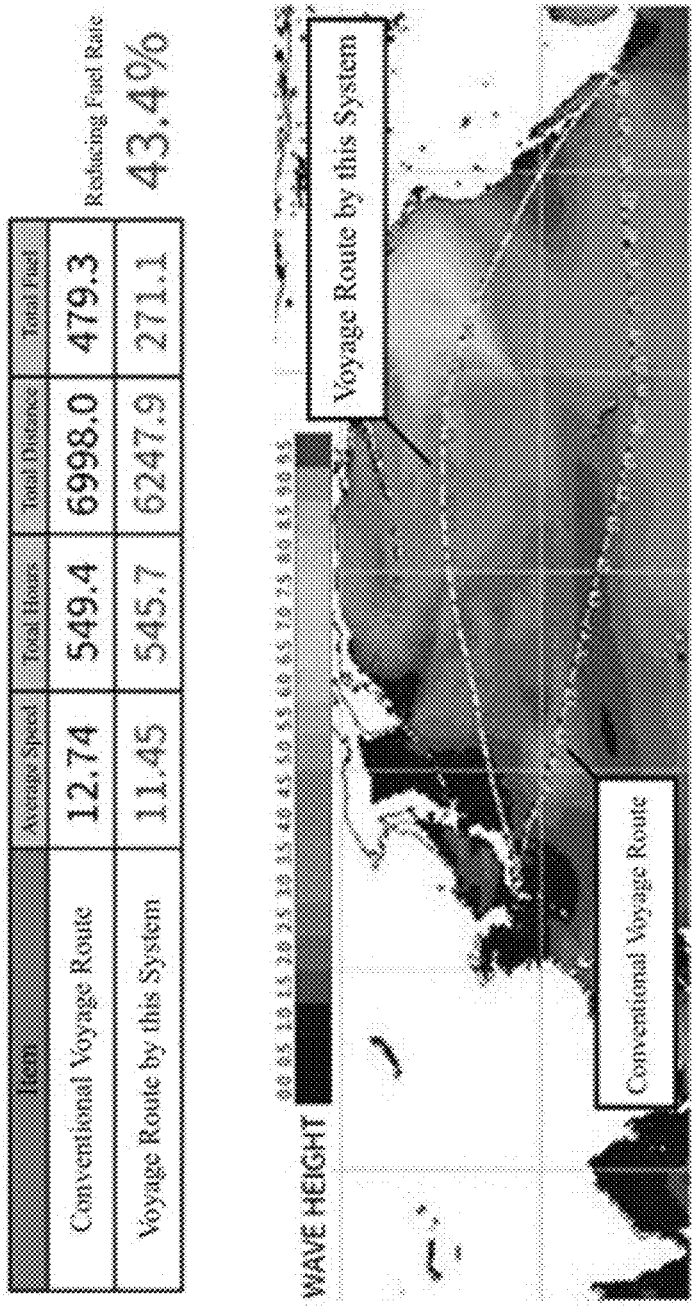
FIG. 24 is a diagram showing an example of a screen by the route navigation system according to Embodiment 2.

An actual voyage experiment 3 will be explained by referring to the screen 2401 in FIG. 24. This voyage was conducted in February 2016 from Japan to the United States. The conventional routing company selected a big detour to avoid stormy areas having over 4-5 m wave height, regardless of the ship size, type, and so on. However, even if the wave height reaches over 4-5 m, it is possible to sail through in a state where the acceleration value (angle) is within the threshold. In addition, it was proven that the route navigation system 1 achieved a big reduction of fuel consumption and a shortened voyage period. As a result of this, the recommended route by the route navigation system 1 could reduce the fuel consumption by 208.2 tons. The reduction percentage was about 43.4%.

Experiment 4

Figure 25:
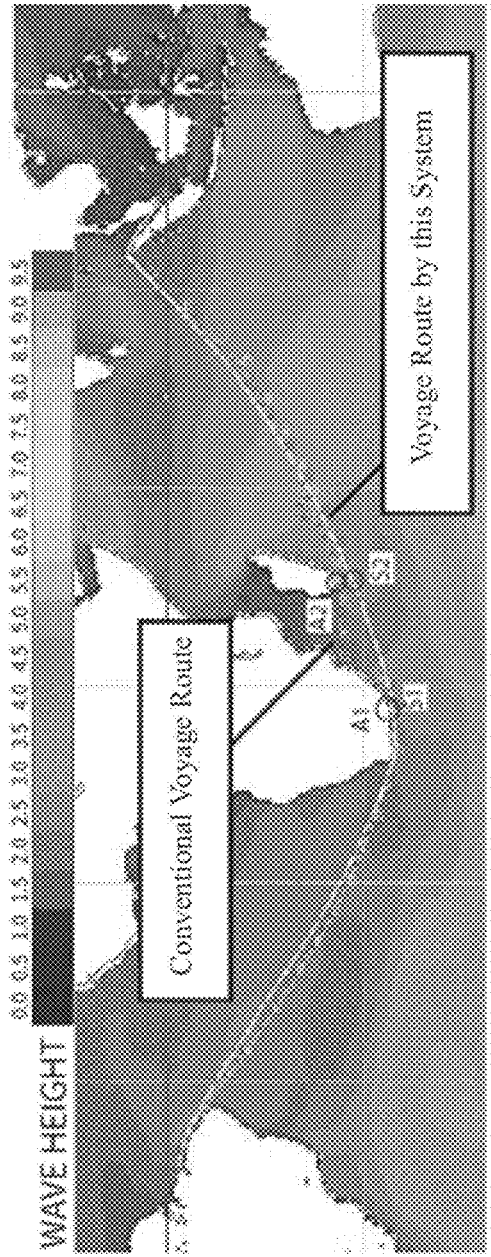
FIG. 25 is a diagram showing an example of a screen by the route navigation system according to Embodiment 3.

An actual voyage experiment 4 will be explained by referring to the screen 2401 in FIG. 25. This voyage was conducted in August 2014 from Brazil to Singapore. The unique point of this voyage was that the conventional routing company advised the ship to take a detour and to sail along the continent at a slower speed after passing the Cape of Good Hope to avoid strong wave and wind. However, the unique point was that the wave height was 3.6~5.6 m from A1 (according to the log of the voyage) to A2 and that, the simulation showed the wave height 4.4~5.9 m with the following wind from S1 (simulation) to S2. In addition, the wave•wind direction of S1~S2 was from 240~250 degrees. This means that the wind was coming from the rear side of the ship and that the ocean current was also from the rear side. The route selected by the route navigation system 1 achieved a very stable voyage having V Acceleration 0.22~0.14, H Acceleration 0.14~0.11. As a result, the recommended route by the route navigation system 1 could reduce the fuel consumption by 194.5 tons. The reduction percentage was about 9.8%.

Experiment 5

Figure 26:
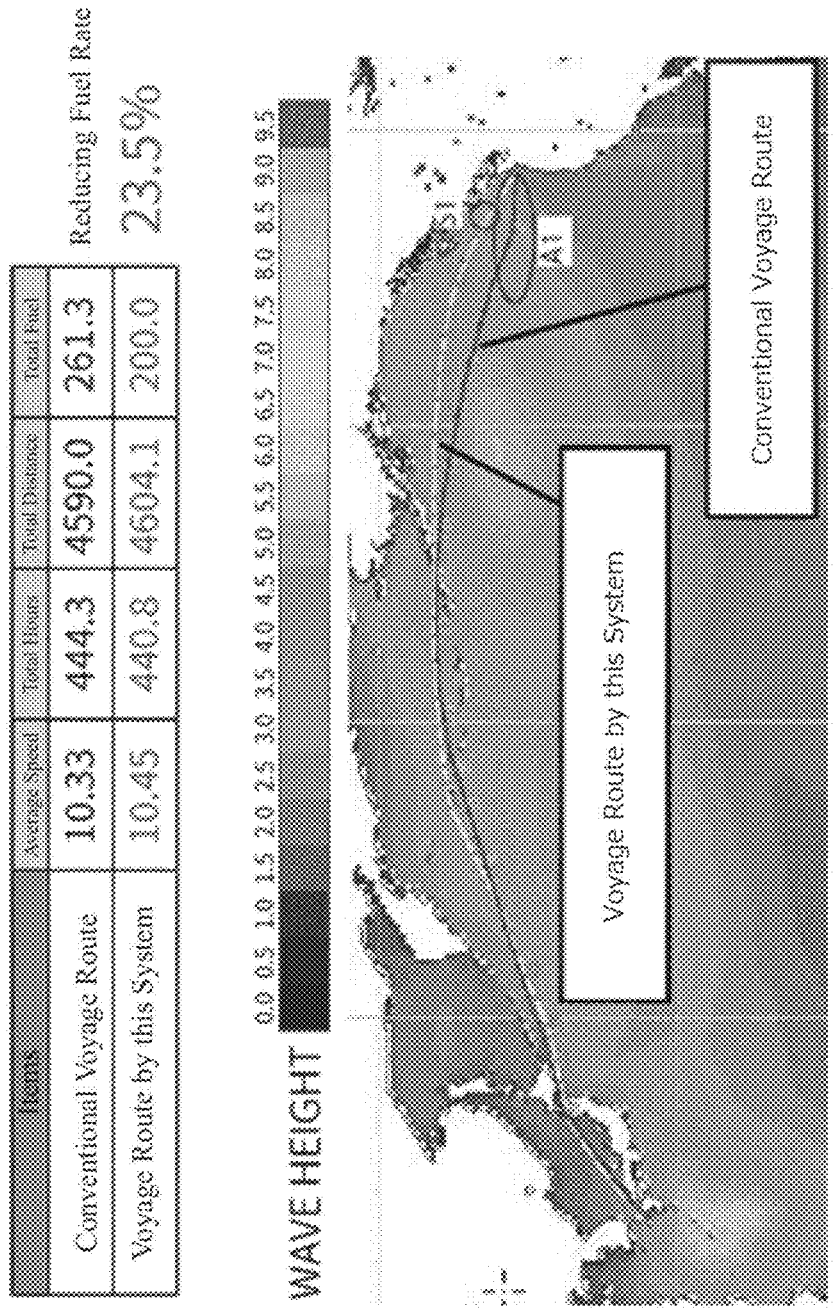
FIG. 26 is a diagram showing an example of a screen by the route navigation system according to Embodiment 4.

An actual voyage experiment 5 will be explained by referring to the screen 2601 in FIG. 26. This voyage was conducted in October 2014 from America to Japan. Due to the small size of this ship, it was affected a lot by weather conditions, especially in stormy areas. The voyage was in the stormy season in the North American sea. It was expected to become a very severe voyage when it departed from Oregon Port. Therefore, to avoid sailing stormy areas, the conventional routing company instructed the ship to sail at an extremely slow speed, which was around 10.1~7.6 Knot, despite big sways. On the contrary, the route navigation system 1 estimated to encounter a stormy region in a few days from the departure date. However, the V Acceleration value was 0.4~0.27 which was within the threshold, and the system estimated no dangerous voyage after said region. As a result, the recommended route by the route navigation system 1 reduced the fuel consumption by 31.3 tons. The reduction percentage was about 23.5%. In addition, the ship arrived at the destination 3.5 hours earlier.

Figure 27A:
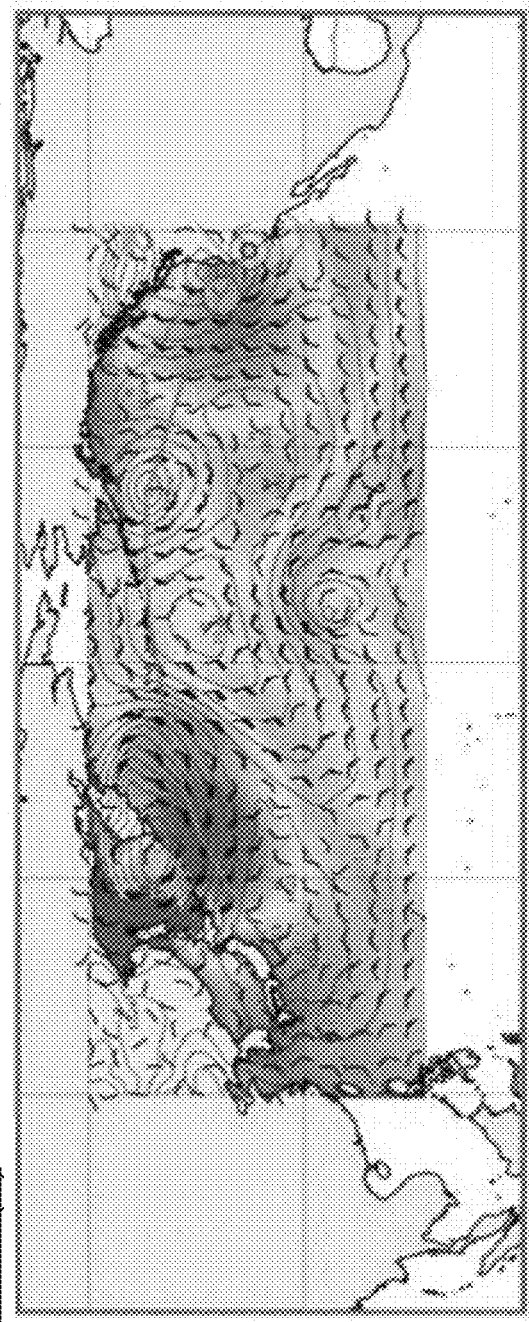
FIG. 27(a)~27(b) are diagrams showing examples of a Web browser when the terminal device uses the application (get weather).
Figure 27B:
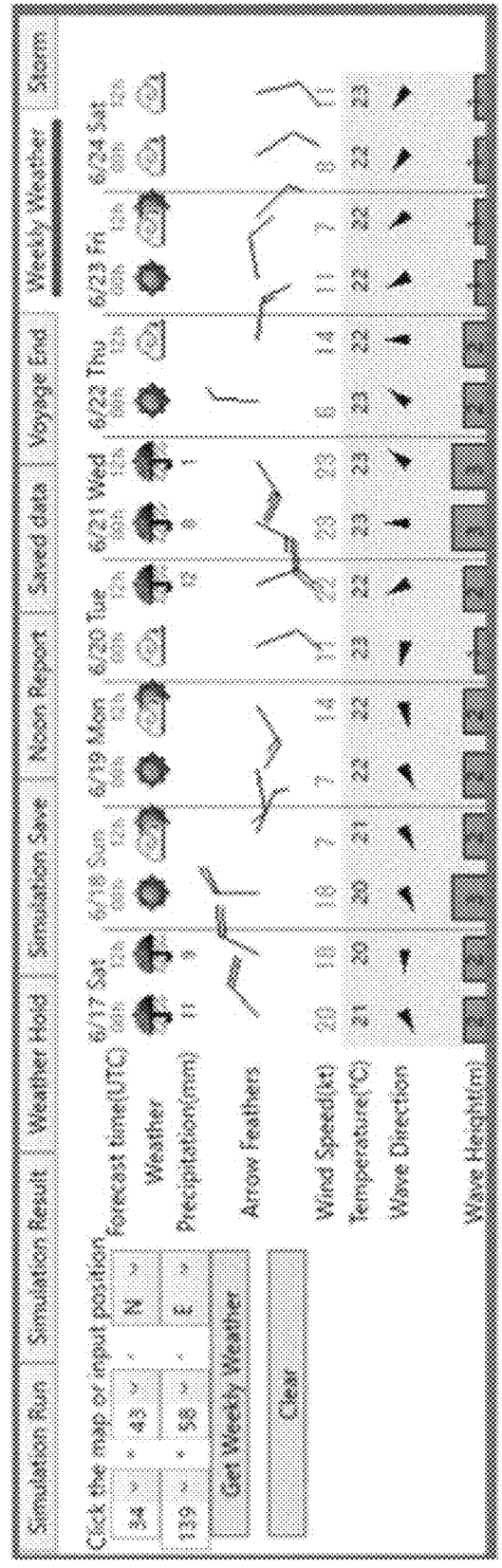
Figure 28:
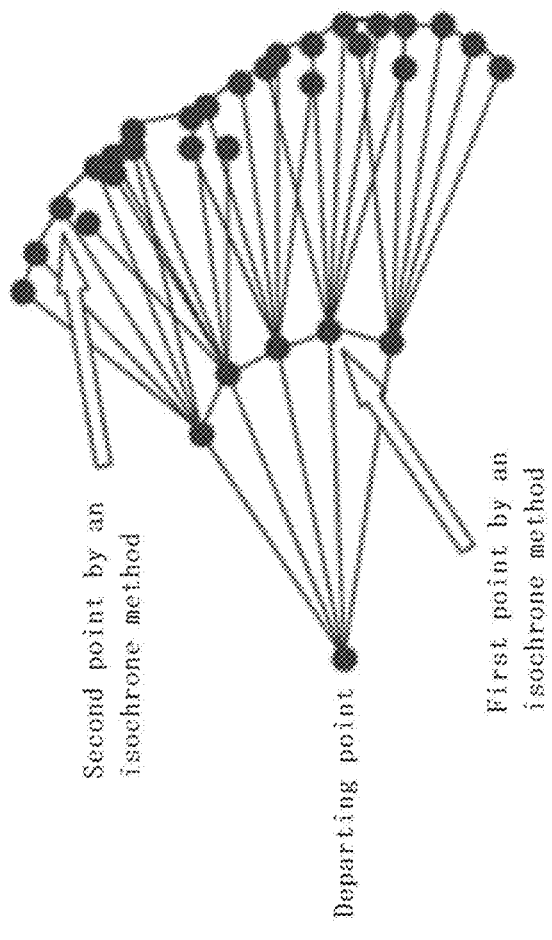
FIG. 28 is an explanatory diagram showing an isochronous curve method conducted by the conventional method.

It is to be noted that the present invention is not limited to the above-described embodiments and modified examples, and various modifications are possible within the spirit and scope of the present invention. For example, the application operated the terminal device 10 can display wave height, wind, air pressure, and so on, which are shown on the screen 2701, FIG. 27(*a*). The application can also display weather information such as weekly weather forecast as shown on the screen 2702, FIG. 27(*b*).

NUMERICAL REFERENCES

1 Route Navigation System
10 Terminal device
11 Input Unit
12 Application Processing Unit
13 Request Generation Unit
14 Transmit and Receive Unit
15 Processing Unit
16 Memory Unit
17 Display Unit
20 Route Navigation Server
21 Weather•marine information obtaining unit
22 Satellite Information Obtaining Unit
23 Weather•Marine Information Memory Unit
24 Satellite Information Memory Unit
25 User Information Memory Unit
26 Route Estimation Unit
26*a* Ocean Current Analysis Unit
26*b* Ship Resistance Force Calculation Unit
26*c* Long Term Weather•marine Conditions Analysis Unit
26*d* Optimum navigation route analysis unit
27 User Judgment Unit
28 Request-Response Generating Unit
29 Transmit-Receive Unit
30 Weather Information Distributing Server
40 Satellite Information Distributing Server
50 Marine Information Distributing Server
60 Weather Sensor
70 Artificial Satellite
80 Oceanic Observation Buoy
90 Ship

What is claimed is:

1. A route navigation system for ships to provide a navigation route, the route navigation system comprising:
a weather information distributing server which distributes weather data obtained from a weather sensor;
a marine information distributing server which distributes marine data obtained from a marine sensor;
a satellite information distributing server which distributes satellite data obtained from an artificial satellite;
a route navigation server which performs route navigation for ships by obtaining data from the weather information distributing server, the marine information distributing server, and the satellite information distributing server when requested; and
a terminal device that processes a certain application, and that obtains a result of the route navigation from the route navigation server and displays the result in a state where a user requests the route navigation via the application,
wherein the weather information distributing server, the marine information distributing server, the satellite information distributing server, the route navigation server and the terminal device are connected to one another via the Internet.

2. The route navigation system according to claim 1, further comprising:
a weather marine information obtaining unit that obtains weather information from the weather information distributing server and marine information from the marine information distributing server;
a satellite information obtaining unit that obtains satellite information from the satellite information distributing server;
a weather marine information memory unit that memorizes weather marine information obtained by the weather marine information obtaining unit and analyzed weather marine information;
a satellite information memory unit that memorizes satellite information obtained by the satellite information obtaining unit and analyzed satellite information;
a user information memory unit that memorizes information relating to a user of the terminal device;
a route estimation unit that performs a route navigation using the weather marine information and the satellite information in a state where a user requests the route navigation;
a user judgment unit that judges a user of the terminal device; and
a transmit-receive unit that transmits and receives data among the weather information distributing server, the satellite information distributing server, the marine information distributing server and the terminal device.

3. The route navigation system according to claim 2, wherein the route estimation unit comprising:
an oceanic current analysis unit that analyzes ocean current direction and current speed based on satellite information obtained by the satellite information obtaining unit and observation information of weather marine information obtained by the weather marine information obtaining unit;

a long term weather marine conditions analysis unit that generates future weather marine scenarios based on satellite information obtained by the satellite information obtaining unit, various weather marine observation data obtained by the weather marine information obtaining unit, data memorized in the weather marine information memory unit, and data memorized in the satellite information memory unit;

a ship resistance force calculation unit that performs analysis, which is integrated with seaworthiness theory, wave resistance increase and vessel rolling control based on a result from the oceanic current analysis unit and the long term weather marine conditions analysis unit, and that calculates a resistance force of a vessel by wave·wind·swell·ocean current; and an optimum navigation route analysis unit that utilizes analysis result by the oceanic current analysis unit, the long term weather marine conditions analysis unit and the ship resisting force calculation unit, and that carries out optimum route navigation using Dynamic Program Dijkstra's Algorithm.

4. The route navigation system according to claim 3, wherein the route estimation unit is operable to calculate at least one of the position of the ship (Longitude, Latitude), the ship course (Course (Deg.), estimated speed during a voyage (Speed (kt)), days calculated based on hours (Day), voyage distance (Dist. (mile)), fuel consumption (Fuel (ton)), engine speed (RPM), Pitch degree (Pitch (Deg.)), Rolling degree (Roll (Deg.)), Vertical Acceleration (V Acceleration), Horizontal Acceleration (H Acceleration), Sea margin (Sea Margin), Wave Wind influence on the speed of the ship (Wave·Wind (kt)), Current influences on the speed of the ship (Current(kt)), Wave height (Wave Height (m)), Wave period (Period (s)), and Wind direction from the ship (Direction (deg.)), according to each point number (Point No.) on a map.

5. The route navigation system according to claim 3, wherein the ship resistance force calculation unit is operable to estimate decreasing speed value, which is influencing forces by wind and waves (Wave/Wind(kt)) against the ship, based on wave height (wave heights (m)), wave periods (periods) and wave·wind direction from the ship (Direction(Deg)) analyzed by the ocean current analysis unit and the long term weather marine conditions analysis unit, and to calculate fuel consumption (Fuel consumption(ton/day)) based on the decreasing speed value at each mesh point on the map.

6. The route navigation system according to claim 5, wherein the ship resistance force calculation unit is operable to calculate vertical acceleration (V Acceleration) and horizontal acceleration (H Acceleration) of the ship based on wave heights (m) and wave direction (Deg) at each mesh point obtained from the ocean current analysis unit and the long term weather marine conditions analysis unit.

7. The route navigation system according to claim 6, wherein the optimum navigation route analysis unit does not include a point in the navigation route in a state where said calculated vertical acceleration (V Acceleration) and horizontal acceleration (H Acceleration) at the point are more than a certain threshold.

8. The route navigation system according to claim 7, wherein the certain threshold is in a range between 0.5~0.8 G according to a type of the ship.

9. The route navigation system according to claim 8, wherein the terminal device comprising;
an input unit that accepts input information from the user;
an application processing unit that performs a specialized application in the form of a Web browser to perform route navigation;
a request generation unit that generates a route navigation request to the route navigation server when a route navigation request is required from the user via the input unit;
a transmit and receive unit that transmits the route navigation request to the route navigation server;
a processing unit that performs GUI display based on the navigation result when the navigation result is received from the route navigation server;
a memory unit; and
a display unit that displays GUI.

10. The route navigation system according to claim 9, wherein the specialized application requires the user to set a ship specification information as an initial registration via the input unit, and
wherein the ship specification includes at least one of the ship name, FULL LOAD speed (kt), FULL LOAD displacement weight(t), HEAVY BALLAST speed(kt), HEAVY BALLAST displacement weight(t), horsepower(kw), fuel consumption (ton/day), engine roll per minutes (rpm), cargo type, storage factor, the date of the production, and IMO number.

11. The route navigation system according to claim 10, wherein the terminal device requires the user to input a departure port, an arrival port, basic information (engine speed, fuel consumption, and cargo type) via the input unit after a log-in of the specialized application.

12. The route navigation system according to claim 11, wherein the display unit displays at least one of Minimum fuel route, Minimum Time route and Minimum Distance route on the map in a state where the terminal device performs a simulation.

13. The route navigation system according to claim 12, wherein dangerous points can be colored in a different coloration in a state where the terminal device performs a simulation.

14. A program for a route navigation system for ships, the route navigation system comprising:
a weather information distributing server which distributes weather data obtained from a weather sensor;
a marine information distributing server which distributes marine data obtained from a marine sensor;
a satellite information distributing server which distributes satellite data obtained from an artificial satellite;
a route navigation server which performs route navigation for ships by obtaining data from the weather information distributing server, the marine information distributing server, and the satellite information distributing server when requested; and
a terminal device that processes a certain application, and that obtains a result of the route navigation from the route navigation server and displays the result in a state where a user requests the route navigation via the application, wherein the program causing a computer to execute:
   obtaining weather information from the weather information distributing server and marine information from the marine information distributing server;
   obtaining satellite information from the satellite information distributing server;
   memorizing weather marine information obtained by the weather marine information obtaining unit and analyzed weather marine information;
   memorizing satellite information obtained by the satellite information obtaining unit and analyzed satellite information;
   a user information memory unit that memorizes information relating to a user of the terminal device;
   performing a route navigation using the weather marine information and the satellite information in a state where a user requests the route navigation;
   judging a user of the terminal device; and
   transmitting and receiving data among the weather information distributing server, the satellite information distributing server, the marine information distributing server and the terminal device.

* * * * *